(12) United States Patent
Sciammarella et al.

(10) Patent No.: US 10,055,089 B2
(45) Date of Patent: *Aug. 21, 2018

(54) SYSTEM FOR MANAGING DATA OBJECTS

(71) Applicant: Tessera Advanced Technologies, Inc., San Jose, CA (US)

(72) Inventors: Eduardo Agusto Sciammarella, Los Angeles, CA (US); Masakazu Hayashi, Chiba (JP); Makoto Imamura, Tokyo (JP); Masato Kuninori, Tokyo (JP); Haruo Oba, Kanagawa (JP); Junichi Rekimoto, Kanagawa (JP); Hideyuki Agata, Tokyo (JP)

(73) Assignee: Tessera Advanced Technologies, Inc., San Jose, CA (US)

( * ) Notice: Subject to any disclaimer, the term of this patent is extended or adjusted under 35 U.S.C. 154(b) by 190 days.

This patent is subject to a terminal disclaimer.

(21) Appl. No.: 15/191,206

(22) Filed: Jun. 23, 2016

(65) Prior Publication Data

US 2016/0334965 A1 Nov. 17, 2016

Related U.S. Application Data

(63) Continuation of application No. 13/691,922, filed on Dec. 3, 2012, now Pat. No. 9,377,927, which is a (Continued)

(30) Foreign Application Priority Data

Apr. 21, 2000 (JP) .................................. 2000-121298

(51) Int. Cl.
*G06F 3/00* (2006.01)
*G06F 3/0481* (2013.01)
*G06F 3/0482* (2013.01)
*G06F 3/0483* (2013.01)
*G06F 3/0485* (2013.01)
*G06F 17/30* (2006.01)

(Continued)

(52) U.S. Cl.
CPC ........ *G06F 3/04817* (2013.01); *G06F 3/0481* (2013.01); *G06F 3/0482* (2013.01); *G06F 3/0483* (2013.01); *G06F 3/0485* (2013.01); *G06F 3/04815* (2013.01); *G06F 17/30274* (2013.01); *G06F 17/30775* (2013.01); *G06F 17/30994* (2013.01); *H04N 21/4312* (2013.01); *G06F 2203/04806* (2013.01); *H04N 21/42204* (2013.01); *H04N 21/4316* (2013.01); *H04N 21/47* (2013.01)

(58) Field of Classification Search
CPC ..... G06F 3/048; G06F 3/0481; G06F 3/04817
See application file for complete search history.

(56) References Cited

U.S. PATENT DOCUMENTS 5,339,390 A 9/1994 Robertson et al.
5,485,197 A 1/1996 Hearty
(Continued)

*Primary Examiner* — Haoshian Shih
(74) *Attorney, Agent, or Firm* — Hickman Palermo Becker Bingham LLP; Malgorzata A. Kulczycka

(57) ABSTRACT

A device for managing image and audio files displays thumbnails, which are representative of the files, on a screen in different arrangements, depending on the selected layout and order. When the user enters input to indicates that he or she wishes to browse through the thumbnails, the thumbnails move across the screen in sequence, following a path through a focus outline in the center of the screen. The path followed by the thumbnails depends on the selected layout.

20 Claims, 27 Drawing Sheets

Related U.S. Application Data continuation of application No. 11/789,911, filed on Apr. 26, 2007, now Pat. No. 8,352,882, which is a continuation of application No. 11/078,766, filed on Mar. 11, 2005, which is a continuation of application No. 09/838,484, filed on Apr. 19, 2001, now Pat. No. 7,051,291.

(51) Int. Cl.
*H04N 21/422* (2011.01)
*H04N 21/431* (2011.01)
*H04N 21/47* (2011.01)

(56) References Cited

U.S. PATENT DOCUMENTS

| | | |
|---|---|---|
| 5,515,486 A | 5/1996 | Amro et al. |
| 5,528,739 A | 6/1996 | Lucas |
| 5,677,708 A | 10/1997 | Matthews et al. |
| 5,678,015 A | 10/1997 | Goh |
| 5,742,779 A | 4/1998 | Steele et al. |
| 5,812,123 A | 9/1998 | Rowe |
| 6,052,100 A | 4/2000 | Soltan et al. |
| 6,201,540 B1 | 3/2001 | Gallup et al. |
| 6,243,761 B1 | 6/2001 | Mogul et al. |
| 6,346,951 B1 | 2/2002 | Mastronardi |
| 6,466,237 B1 | 10/2002 | Miyao et al. |
| 6,628,313 B1 | 9/2003 | Minakuchi et al. |
| 6,636,246 B1 | 10/2003 | Gallo et al. |
| 6,819,344 B2 | 11/2004 | Robbins |
| 6,857,128 B1 | 2/2005 | Borden et al. |
| 6,883,140 B1 | 4/2005 | Acker et al. |
| 9,377,927 B2 | 6/2016 | Sciammarella et al. |
| 2016/0210017 A9 | 7/2016 | Sciammarella |

ACTUAL DISPLAYED
POSITIONS Si

DESIRED TARGET
POSITIONS Di

SYSTEM FOR MANAGING DATA OBJECTS

BENEFIT CLAIM

This application claims the benefit under 35 U.S.C. § 120 as a continuation of application Ser. No. 13/691,922, filed Dec. 3, 2012, which claims the benefit under 35 U.S.C. § 120 as a continuation of application Ser. No. 11/789,911, filed Apr. 26, 2007, which claims the benefit under 35 U.S.C. § 120 as a continuation of application Ser. No. 11/078,766, filed Mar. 11, 2005, now abandoned, which claims the benefit under 35 U.S.C. § 120 as a continuation of application Ser. No. 09/838,484, filed Apr. 19, 2001, which claims the rights of priority under 35 U.S.C. § 119 to Japanese patent application no. 2000-121298, filed Apr. 21, 2000, the entire contents of which are hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

BACKGROUND OF THE INVENTION

1. Field of the Invention

The present invention relates to an on-screen graphical user interface, and database management.

2. Related Art

Digital cameras, mini disks, and other devices for recording and playing digital media are becoming quite popular. These devices store digital media as data objects in memories such as flash memories, hard disks, and on-line storage.

There are many methods available for managing large numbers of data objects. For example, data objects are frequently managed using windows and folders. U.S. Pat. No. 5,917,488 describes a system for displaying and manipulating image data sets. First, a window including programmed groups is displayed. When a user selects one of the programmed groups, then a second window is displayed with thumbnails that represent data objects of the selected programmed group.

Data objects are also handled in hierarchical lists, using static light-box metaphors. A light-box metaphor displays images in the manner of "slides" all the same size on a white background. The "slides" are arranged in a grid.

There are methods known for selecting a format for displaying data objects. For example, U.S. Pat. No. 5,673,429 describes a system that displays a list of different display formats. When the user selects a desired display format from the list, then items that match the selected format are pulled from a database and displayed in a list that depends on the selected display format.

Memory is becoming available in increasingly large capacities, which enable storage of increasingly large numbers of data objects. For example, memory cards are available that are capable of storing data for several hundred different digital photographs. However, conventional techniques, such as windows, folders, and lists, have a problem in that they are insufficient for presenting such large numbers of data objects in a manner that a user can easily and quickly understand.

SUMMARY OF THE INVENTION

It is an objective of the present invention to solve the above-described problems, and to provide a method and device that allows a user to easily browse, view, manage, select, and command a large number of data objects.

In order to achieve this objective, a device according to the present invention for managing data objects, includes displaying means, defining means, moving means, and enable/disable means.

The displaying means is for displaying thumbnails representative of data objects. The defining means is for defining a focus region that indicates a focus thumbnail subject to processes. The moving means is for moving the displayed thumbnails along a predetermined path through the focus region.

The enable/disable means is for selectively enabling and disabling the moving means. When the enable/disable means disables the moving means, then the displaying means statically displays a single thumbnail in the focus region. When the enable/disable means enables the moving means, then the displaying means displays the thumbnails to move along the predetermined path through the focus region.

BRIEF DESCRIPTION OF THE DRAWINGS

The above and other objects, features and advantages of the invention will become more apparent from reading the following description of the embodiment taken in connection with the accompanying drawings in which:

FIG. 23 (b) is a schematic view showing timing of change of the focus thumbnail;

DETAILED DESCRIPTION OF THE EMBODIMENT

Next, a system according to an embodiment of the present invention will be described while referring to the accompanying drawings. The system is for managing data objects such as digital image files, digital audio files, text files, executable programs, program files, and movie files.

Figure 1:
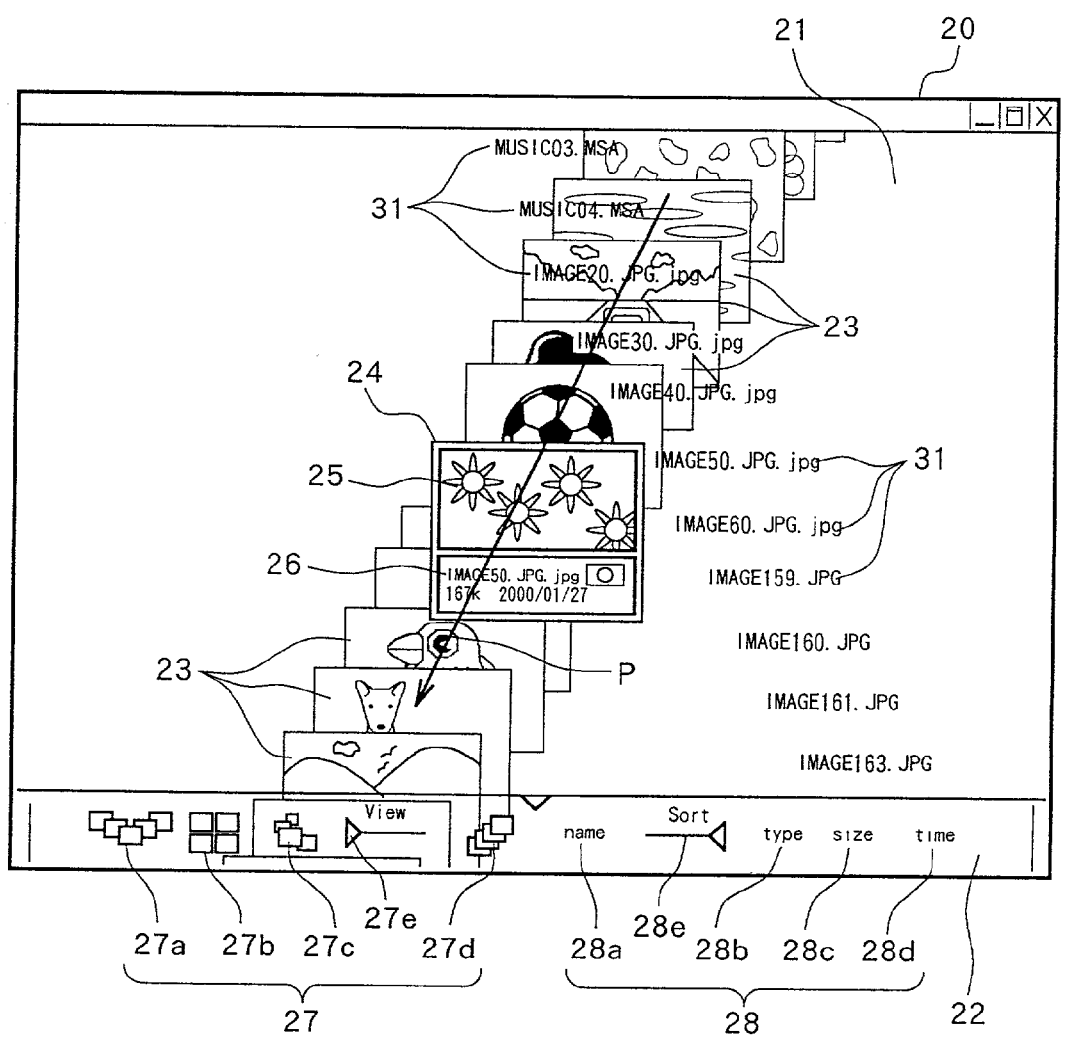
FIG. 1 is a schematic view showing a window display with thumbnails arranged in a line layout.
Figure 2:
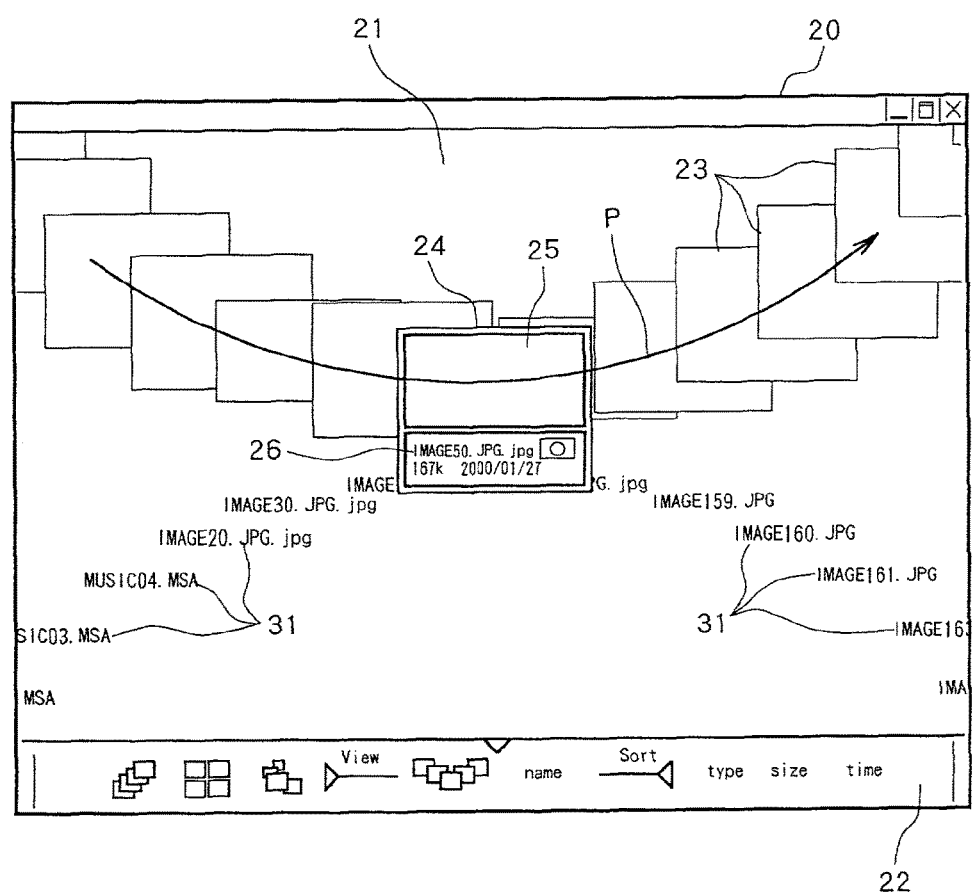
FIG. 2 is a schematic view showing the window display with thumbnails arranged in a circle layout.
Figure 3:
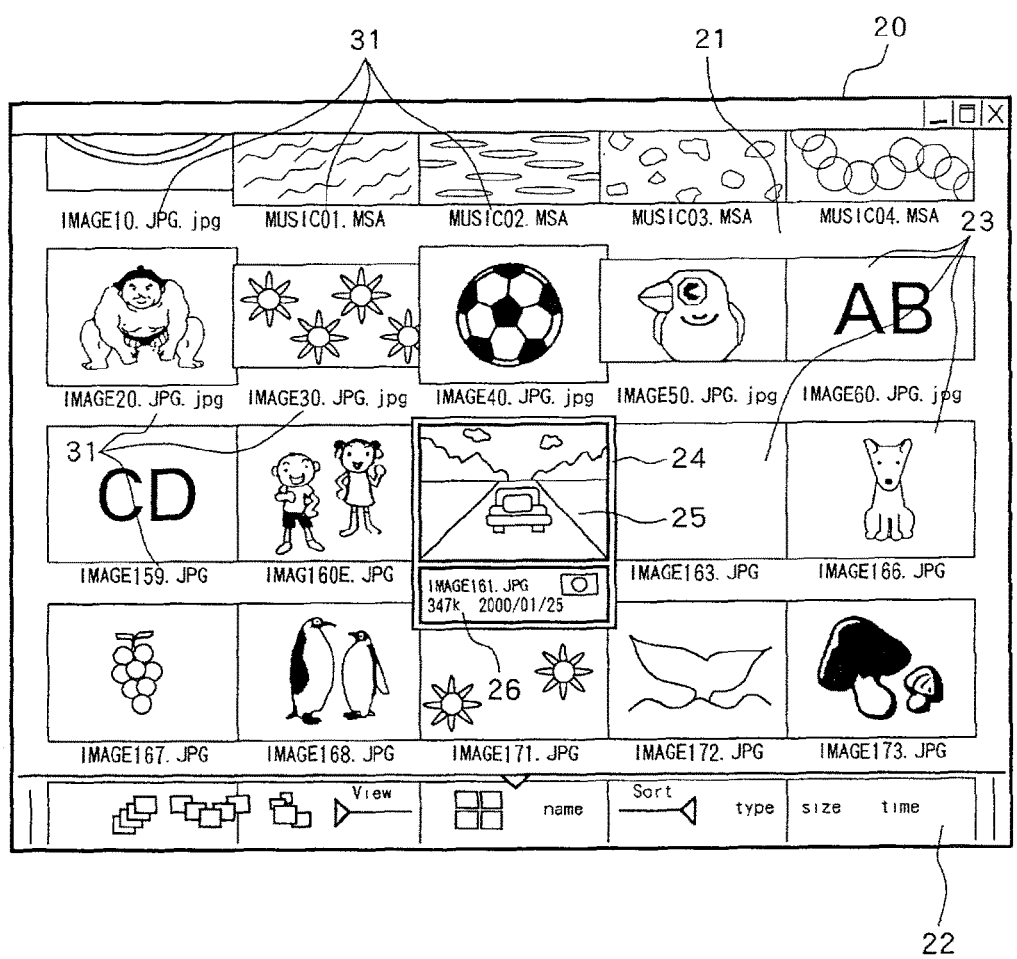
FIG. 3 is a schematic view showing the window display with thumbnails arranged in a grid layout.

As shown in FIGS. 1 to 4, the system displays a window 20 including a thumbnail screen 21 and a layout/order interface 22. Thumbnails 23, that represent a variety of data objects, are displayed in the screen 21. As shown in FIGS. 1 and 3, each of the thumbnails 23 includes an image that is the essence of the corresponding data object. The thumbnails shown in all other drawings include similar images, but the images have been omitted from the drawings to facilitate explanation.

Figure 4:
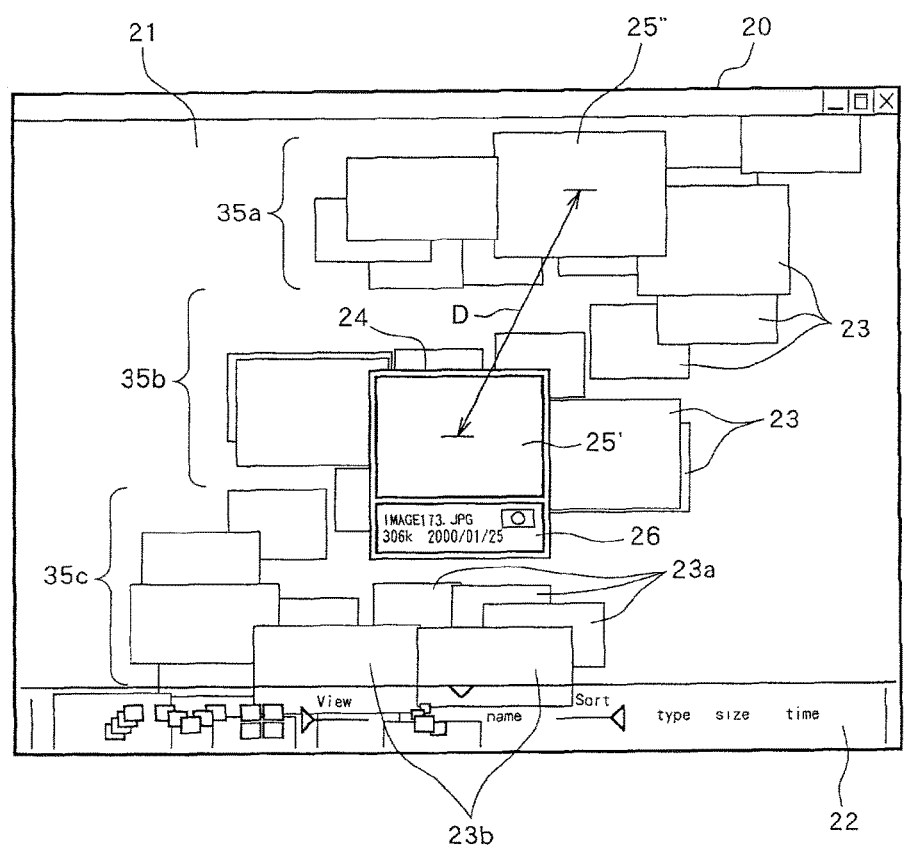
FIG. 4 is a schematic view showing the window display with thumbnails arranged in a helix layout.
Figure 5:
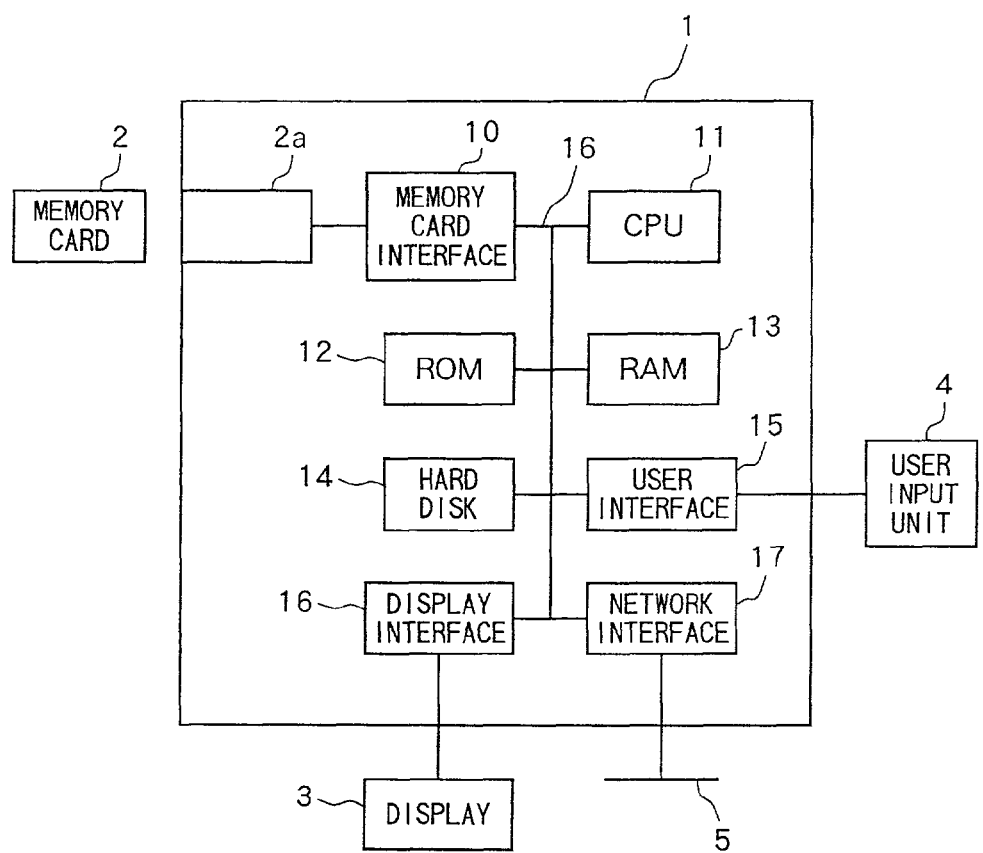
FIG. 5 is a block diagram showing components of a computer and peripheral equipment for displaying the window display of FIGS. 1 to 4.

The thumbnails 23 can be displayed in any of four different graphical display layouts: a line layout as shown in FIG. 1, a circle layout as shown in FIG. 2, a grid layout as shown in FIG. 3, and a helix layout as shown in FIG. 4. As will be described in detail below, the layouts use the X and Y dimensions and scale to layout thumbnails that represent various data objects.

As shown in FIG. 1, a focus outline 24 surrounds the center-most, or focus, thumbnail 25 in the thumbnail screen 21. The focus outline 24 indicates that the focus thumbnail 25 is currently the focus of any operations initiated by input from the user. For example, when input is received for browsing through the thumbnails 23, the thumbnails 23 are dynamically scrolled across the screen through the focus outline 24, following a path P according to the presently implemented layout as indicated by arrows P in FIGS. 1, 2, 16, and 17. In this way, the user's attention can be selectively drawn to particular ones of the thumbnails 23 by dynamically moving the thumbnails 23 through the single screen 21, rather than by using multiple windows in the conventional manner. The single screen 21 is advantageous over multiple windows, because the single screen 21 gives the user a primary focus and a single unified context as he or she manipulates the thumbnails 23, which represent data objects. As will be described in detail below, the thumbnails 23 are moved by panning, scrolling, and zooming in the screen 21 to change the degrees of focus placed on the thumbnails 23.

An information tab 26 is displayed within the focus outline 24 at a position below the focus thumbnail 25. The information tab 26 includes further information about the focus thumbnail 25 such as a file name, date, size, and file type of the data object that corresponds to the focus thumbnail 25.

The layout/order interface 22 is displayed at the bottom of the screen 21 below the display of the thumbnails 23, and includes a layout interface 27 and an order interface 28. The layout interface 27 includes icons 27a to 27b representing each of the four different layouts. The user can select a desired display layout by selecting the corresponding icon 27a to 27d, using a mouse and cursor for example. The icon 27a to 27d that represents the presently selected layout is displayed near the center of the layout/order interface 22 to indicate the presently selected layout. The selected icon can also be changed by clicking on the center icon, or by clicking on an icon 27e. With each click, the icons 27a to 27d switch places with the selected icon one after another in order. The graphical icons 27a to 27d allows a user to select a display layout with more confidence that when selecting by using a list.

The order interface 28 is for selecting one of four different sequence orders that determined arrangement of the thumbnails 23 in the selected layout. The four orders include: name of data object, type of data object, size of the data file, and time the file was stored. The order interface 28 is displayed at the right bottom of the screen, and includes words 28a to 28d that represent each of the four different order types. The word, name 28a in this example, that represents the selected order is displayed near the center of the layout/order interface 22. The selected icon can be changed by either clicking on a desired word, or by clicking on an icon 28e.

Here, a more detailed description of the four layouts will be provided. As shown in FIG. 1, in the line layout, the thumbnails 23 are aligned in a slightly overlapping manner in a single continuous angled line. File names 31 for the data objects are displayed in a separate angled line that intersects the angled thumbnail line. The line layout has a clear beginning and end, so the user can easily grasp the number of data objects.

Figure 16:
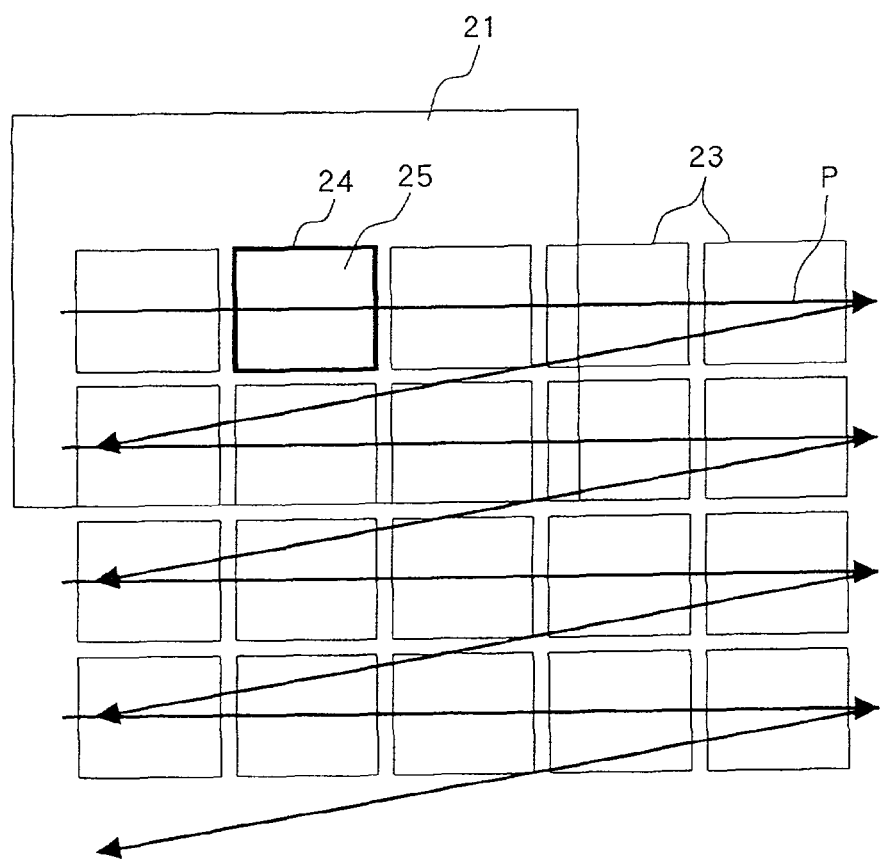
FIG. 16 is a schematic view showing browsing motion of a thumbnail grid in the grid layout.

As shown in FIGS. 2 and 16, the circle layout consists of slightly overlapping thumbnails 23 in an arc of a circular ring. Filenames 31 corresponding to the thumbnails 23 appear in an arc of a second ring that is symmetric to, but inverse from the thumbnail arc. Although not shown in the drawings, when there are only a few thumbnails in the circle layout, the entire circular ring of thumbnails is displayed in the screen 21. At this time, filenames are displayed in a circle below the thumbnail circle. However, the ring enlarges as the number of thumbnails increases, until a portion of the thumbnail ring can not be displayed. When the ring contains thumbnails up to a certain number, then the radius of the arc increases as the size of the ring increases. However, once a certain number of thumbnails 23 is exceeded, so that the ring reaches a certain size, then only an arc having a predetermined radius is displayed as shown in FIG. 2. The radius of the arc is fixed regardless of how many thumbnails 23 are in the ring, because if the radius were varied according to the number of thumbnails 23 in the ring, then the displayed arc would appear linear when the ring contains a large number of thumbnails 23.

As shown in FIG. 4, in the grid layout, the thumbnails 23 are aligned vertically and horizontally, that is, with fixed mutual position in horizontally-extending rows and vertically-extending columns. The number of thumbnails in the rows of the grid layout is determined by how many thumbnails 23 if aligned side by side, can be displayed completely on the screen. In the example shown in FIG. 4, five thumbnails 23 are disposed side by side in each horizontal row, because in this example complete rows of five thumbnails 23 can be displayed in the screen 21 without the thumbnails in the rows overlapping. Any further thumbnails are added by increasing the number of rows, that is, by adding the thumbnails to elongate the columns. It should be noted that rows with more or less than five thumbnails might be desirable, depending on the displaying conditions. The thumbnails 23 contact each other on lateral sides, but have a space between top and bottom sides. The file names 31 appear below each corresponding thumbnail 23. The grid layout displays more complete rows of thumbnails 23, without the thumbnails overlapping, than any of the other layouts.

As shown in FIG. 4, the thumbnails 23 in the helix layout are displayed in the screen 21 in different scales to give the illusion of viewing a three-dimensional helix from the side. That is, thumbnails 23a at the far side of the helix are displayed in a smaller scale than thumbnails 23b at the near side of the helix. The helix shape includes rings 35a to 35c of thumbnails 23. Each ring 35a, 35b, 35c includes about ten thumbnails 23. The helix layout shows a large number of thumbnails at the same time, while maintaining the benefits of a line configuration.

Next, configuration of the file management system for displaying the window 20 will be explained, along with further explanation of various features of the file management system. As shown in FIG. 1, the file management system includes a computer 1, a memory card 2, a display 3, and a user input unit 4.

The memory card 2 can be any memory card, such as a Memory Stick™, a SmartMedia™ memory card, or a Compact Flash™ memory card. The memory card 2 stores data files for a large number of photographs, songs, or any other type of data objects. The other modules of the system can write data objects into, or read data objects from, the memory card 2. The user input unit 4 can be any user interface for inputting commands and the like, such as a keyboard, a jog-dial, a game controller, or an on-screen unit such as a mouse or a pen.

The computer 1 includes a slot 2a for insertion of the memory card 2, a memory card interface 10, a CPU 11, a ROM 12, a RAM 13, a hard disk 14, a user interface 15, a display interface 16, and a network interface 17, all connected together by a bus 16. The user interface 15 is connected to the user input unit 4. The display interface 16 is connected to the display 3. The network interface 17 is connected to a network 5.

FIG. 2 shows functional modules of the computer 1. As shown the computer 1 includes a file manager 11, a layout/order manager 12, a search manager 13, a program manager 14, and a layout/order template stock 15. The functional modules are realized by application software stored in the hard disk 14, or retrieved over the network 5.

The file manager 11 reads data objects from the memory card 2 and stores them in memory, such as the RAM 13.

The layout/order template stock 15 is memory, such as the hard disk 14, that holds a layout/out template for each combination of the four layouts and the four orders. Each layout/order template contains two primary rule sets for the corresponding layout, one set of rules for setting relative positions of thumbnails 23 and another set of rules for movement of thumbnails 23.

Although rules in the layout/order templates will be described later, with respect to relative position of thumbnails, a layout/order template for the grid layout includes layout rules that indicate that each thumbnail should be positioned immediately to the right of the preceding thumbnail, unless the thumbnail is sixth in a thumbnail sequence. If the thumbnail is sixth in the sequence, then the thumbnail should be positioned underneath the first image in the sequence in order to begin a new sequence, that is, to start a new row in the grid. The templates for the line, circle, and helix layouts indicate that the thumbnails should be aligned in line, circle, and helix patterns, respectively.

With respect to rule for movement of the thumbnails, the grid template also includes rules defining that the thumbnails in the grid layout move as shown in FIG. 16 when the user browses through the thumbnails in a manner to be described below. The templates for the line, circle, and helix layouts indicate that the thumbnails should be move following linear, circular, and spiraling paths, respectively.

The program manager 14 reads a layout/order template from the layout/order template stock 15 for the presently selected layout and order. The program manager 14 writes the template into the file manager 11 to apply the template to the data objects stored by the file manager 11. The program manager 14 reads templates from the layout/order template stock 15 and writes them in the file manager 11 each time the layout or order is changed, because only one set of display rules needs to be in active memory at any one time.

The layout/order manager 12 reads information about the data objects in the file manager 11, and draws the corresponding thumbnails 23 accordingly in the presently selected layout. The file layout/order manager 12 controls the display 2 to display the thumbnails accordingly.

The search engine 13 enables a user to search for data objects based on inputted search criteria. The search engine 13 incrementally writes the criteria in the file manager 11. The display 3 changes the screen 21 to display only thumbnails of data objects that satisfy the search criteria. The search engine 13 supports key words and file attributes, such as date, size, color.

Figure 6:
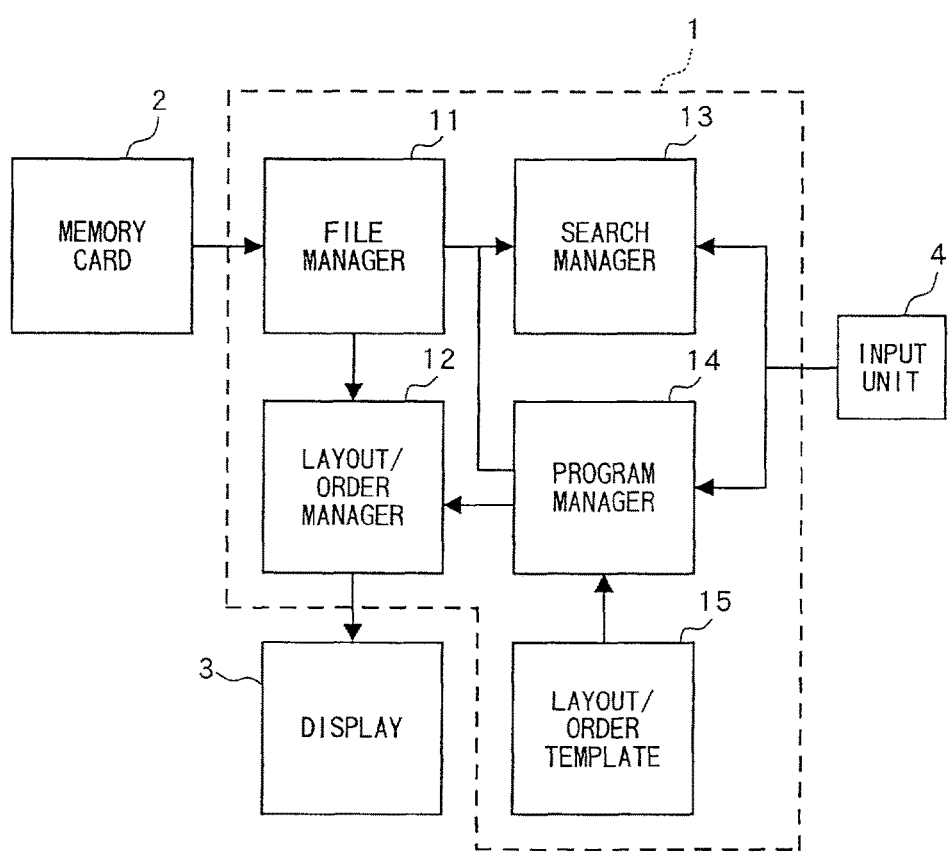
FIG. 6 is a block diagram showing functional modules the computer of FIG. 5.
Figure 7:
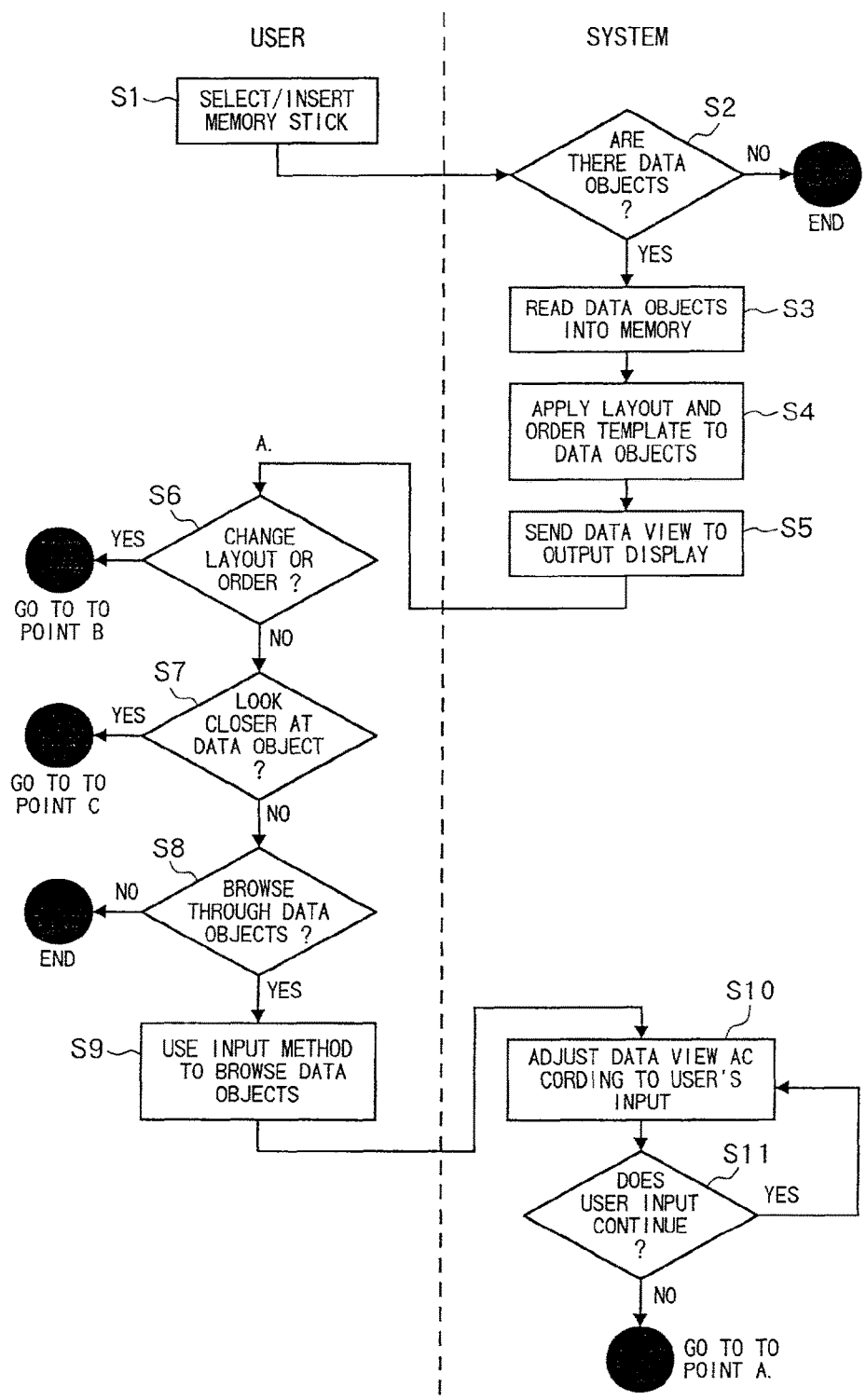
FIG. 7 is a flowchart representing overall processes for implementing the functional modules of FIG. 6.
Figure 8:
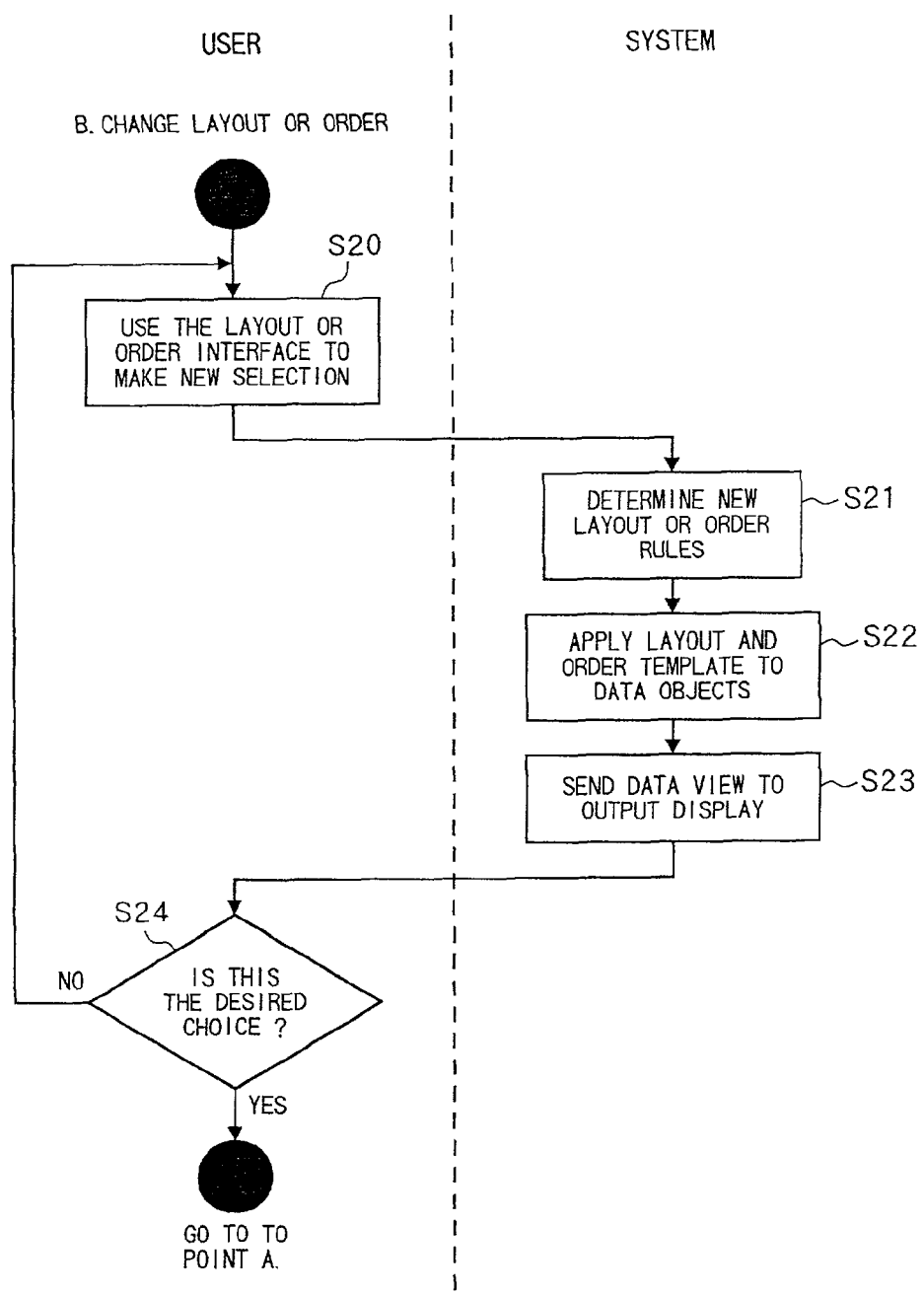
FIG. 8 is a flowchart representing processes for changing layout or order of thumbnails in the window display.
Figure 9:
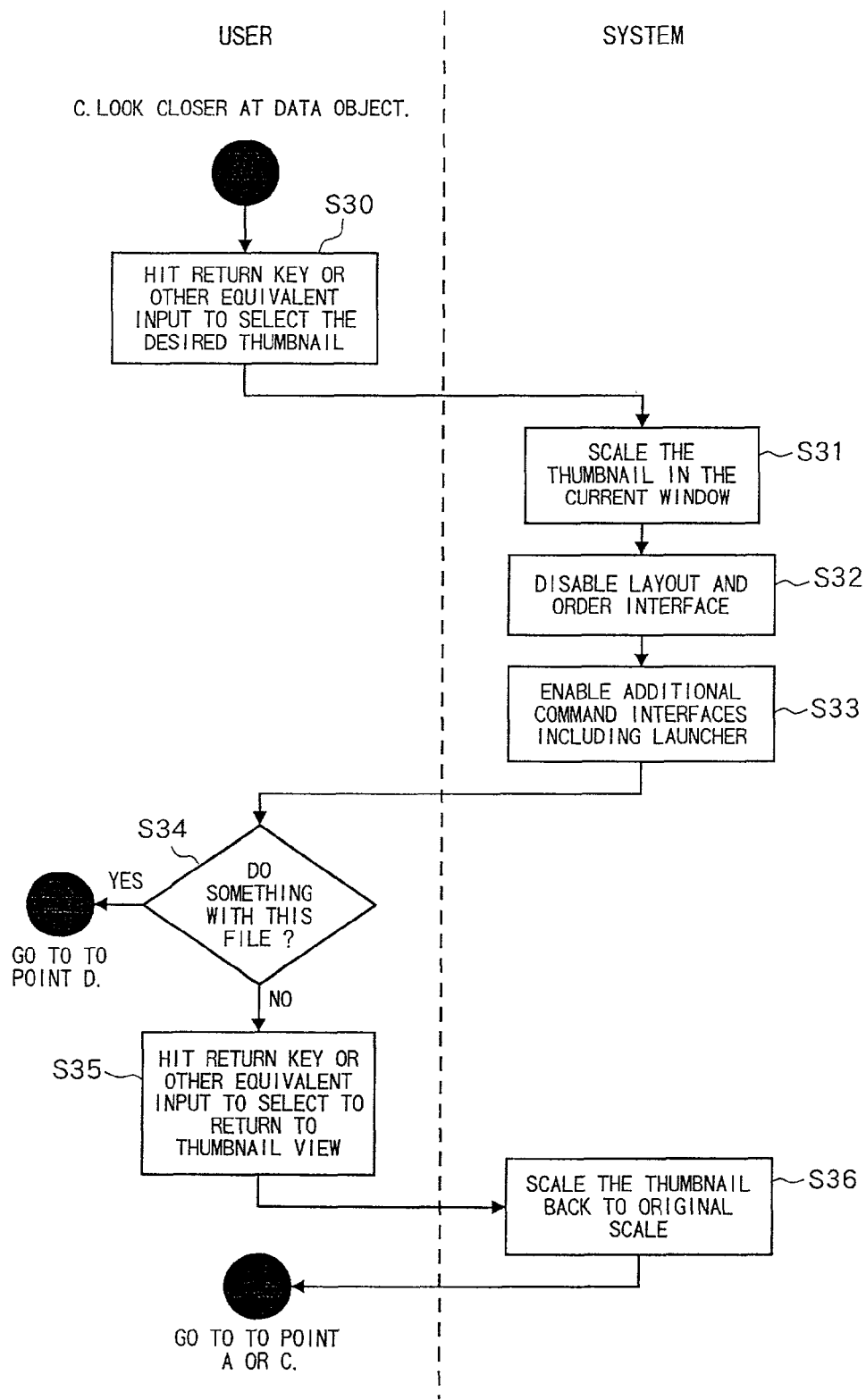
FIG. 9 is a flowchart representing processes for taking a closer look at a focus thumbnail.
Figure 10:
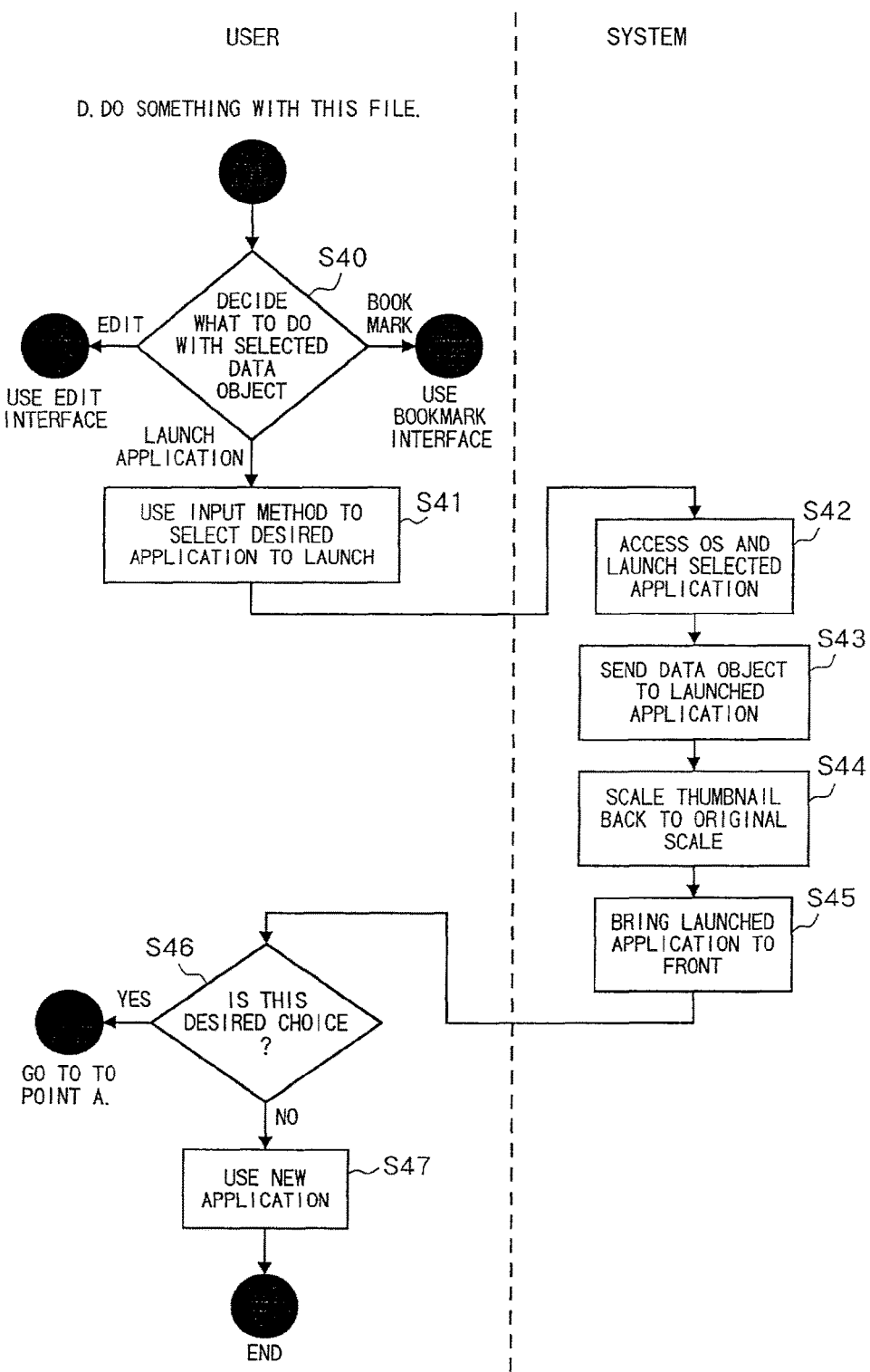
FIG. 10 is a flowchart representing processes for performing further process on the focus thumbnail.

Here, operations of the computer 1 will be described while referring to the flowcharts in FIGS. 7 to 10. In S1, the operating system of the computer 1 recognizes the memory card 2 when the memory card 2 is inserted into the slot 2a. As a result, the operating system launches an executable application for performing the functions of the file manager 11, the layout/order manager 12, and the other function modules in FIG. 6. The executable application can be either retrieved for this purpose from where it is stored in the hard disk 14, or downloaded from over the network 5, for example. In S2, the file manager 11 judges whether the memory card 2 stores any data objects. If not (S2: NO), then the application is ended here.

On the other hand, if the memory card 2 stores data objects (S2: YES), then in S3 the file manager 11 loads the data objects from the memory card 2 one at a time into the RAM 13. In S4, the program manager 14 determines the presently selected layout and order for display of thumbnails to represent the data objects. In the present example, the line layout is set as the default layout, and file name is set as the default order. The program manager 14 then pulls the appropriate layout/order template from the layout/order template stock 15 and stores the layout/order template in the RAM 12. The program manager 14 writes the template on the file manager 11, thereby applying the template to each data object in the file manager 11.

In S5, the file layout/order manager 12 draws a data view for the thumbnails 23 according to the presently selected layout and order, and controls the display 2 to display the thumbnails accordingly.

Figure 11:
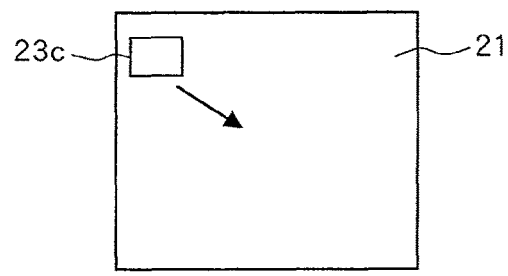
FIG. 11 is a schematic view showing movement of a thumbnail representing a first-loaded data object.

Each thumbnail 23 is displayed as soon as retrieved by the file manager 11, and during the loading process the thumbnails are dynamically arranged on the screen according to the presently selected layout. That is, as shown in FIG. 11, a thumbnail 23c of the first-loaded data object is displayed at the upper left corner of the screen 21 and then moved to the center of the screen 21. The focus outline 24 is displayed surrounding the thumbnail 23c in a size that matches the dimensions of the thumbnail 23c.

Figure 12:
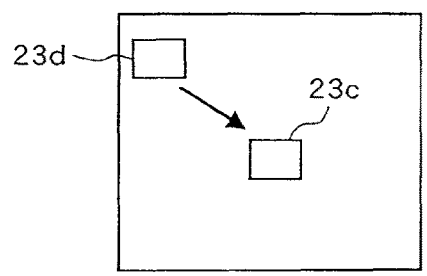
FIG. 12 is a schematic view showing movement of thumbnails as further data objects are loaded.
Figure 13:
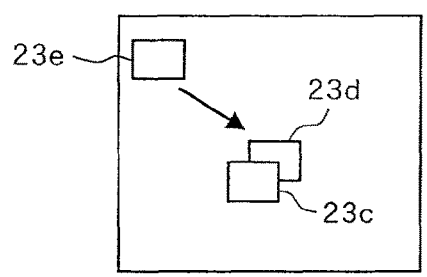
FIG. 13 is a schematic view showing movement of thumbnails as further data objects are loaded.
Figure 14:
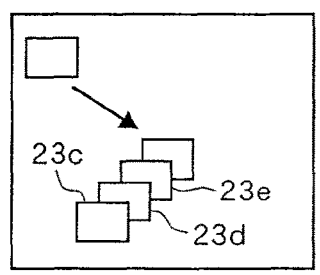
FIG. 14 is a schematic view showing movement of thumbnails as further data objects are loaded.

As shown in FIG. 12, a thumbnail 23d of the second-loaded data object is similarly displayed at the upper left corner and then moved to the center of the screen 21. At this time, the first thumbnail 23c moves slightly to the lower left of center. Once the thumbnail 23d is centered in the screen 21, it is displayed surrounded by the focus outline 24 to indicate that the thumbnail 23d is the currently selected thumbnail. In this way, the center thumbnail is always designated as the focus of user input. As shown in FIGS. 13 and 14, this process continues until all the data objects have been loaded from the memory card 2 into the file manager 11. The user need not wait for all data objects to be loaded, but can begin browsing through the thumbnails while the remaining data objects are being loaded.

Figure 15:
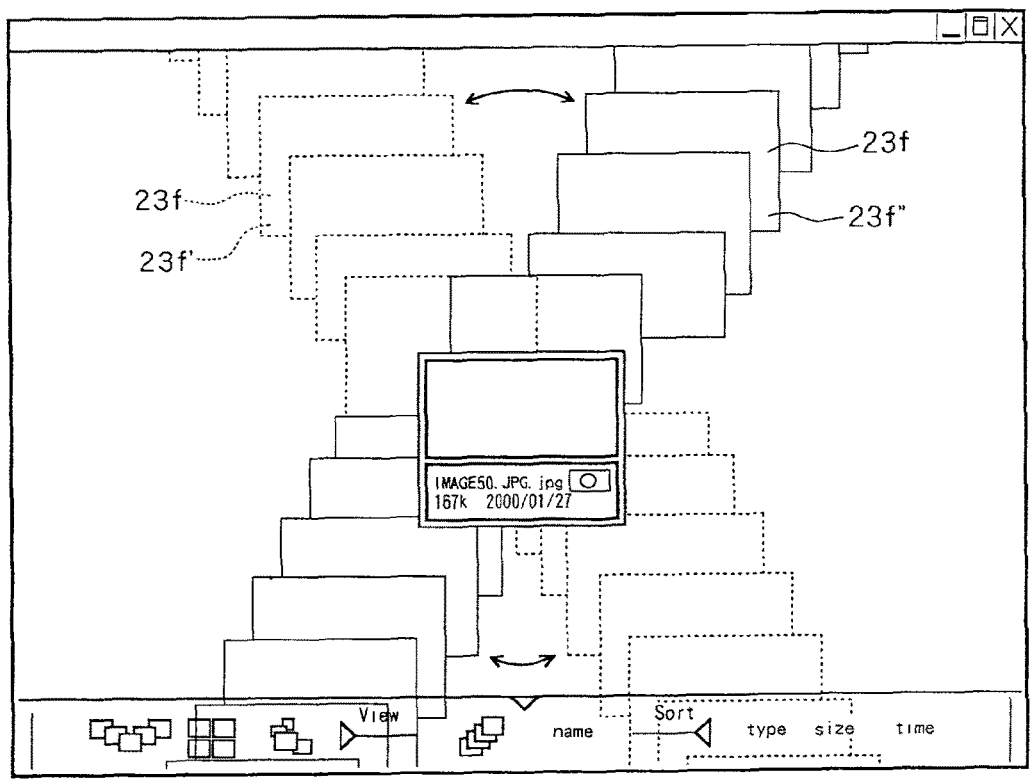
FIG. 15 is a schematic view graphically representing pivoting movement of a thumbnail line in the line layout.

During and after the loading process, the layout/order manager 12 controls the display 3 to move the thumbnails in the line layout dynamically with a reciprocal pivoting motion, based on the oscillation of a pendulum. The center of the focus thumbnail 25 serves as the unmoving axis of the pivoting movement. In FIG. 15, the positions of thumbnails while at one extreme of the pivoting motion are indicated in solid line and the positions of thumbnails while at the other extreme are indicated in dotted line. The reciprocal pivoting motion exposes most or all of each thumbnail over a short period of time, so that the viewer can gain a better grasp of each displayed thumbnail. For example, as the thumbnail line swings back and forth, lower right and left sections 23f', 23f" of a thumbnail 23f are alternately exposed. It should be noted that all the other layouts except the grid layout also move dynamically to reveal most or all of each thumbnail in time.

This movement of the thumbnail layout also informs the user that the thumbnail can be interacted with in a dynamic manner. For example, the user can choose to change the layout or order of the thumbnails (S6), to look closer at the data object that is presently selected (S7), or to browse through the thumbnails (S8).

If the user wishes to browse through the thumbnails (S8: YES), then in S9 the program manager 14 receives browsing input from the user. In S10, the layout/order manager 12 controls the display 3 to adjust how the thumbnails 23 are displayed, according to the browsing input from the user. In S11, the layout/order manager 12 continuously adjusts display screen of the display 3 as long as input is received from the user. Once the user stops providing browsing input (S11: NO), then the routine returns to S6.

When the browsing input is singular in nature, such as from pressing an arrow key on a keyboard once, then this indicates that the user wishes to change the selected thumbnail 25 to the thumbnail adjacent to the current selected thumbnail, that is, the thumbnail either prior or subsequent to the center thumbnail in the displayed thumbnail train. As a result, the layout/order manager 12 controls the display 3 to smoothly shift the thumbnail in the thumbnail train one position in the direction that moves the indicated adjacent thumbnail to the center of the screen. Although the focus outline 24 remains generally at the center of the screen 21, it can also be moved slightly toward the adjacent thumbnail as the adjacent thumbnail is shifted toward center, to further increase the smooth flowing movement of the displayed layout.

When the browsing input is continuous in nature, such as when the user continuously holds down an arrow key, then the layout/order manager 12 controls the display 3 to continuously stream the thumbnails train through the focus outline 24 on the screen 21. This enables the user to browse through the thumbnails of all the loaded data objects, even when the memory card 2 stores a great number of data objects, so that not all thumbnails can be displayed on the display 3 at the same time.

In the case of the circle layout, the displayed circle of thumbnails rotates so that the thumbnails 23 in the loop move through the focus outline 24. This allows the user to browse in a circular manner. The user does not have to be conscious of the beginning or end because they are linked. As mentioned above, when the ring can include a large number of thumbnail, then only a portion of the thumbnails are displayed at one time in an arc as shown in FIG. 2. In this case, the displayed thumbnails 23 are sequentially moved on and off the display during the browsing operation, thereby constantly changing the thumbnails presently being displayed.

In the case of the grid layout, all the thumbnails 23 remain in the same position with respect to each other during the browsing operation. When the user input indicates horizontal scroll, then as shown in FIG. 16 the entire grid is moved in a zigzag pattern across the screen 21 as indicated by arrow P. Although the grid is actually configured with the same or smaller width than the screen 21, the width of the grid is shown larger than the width of the screen 21 in FIG. 21 to facilitate understanding. This moves the thumbnails 23 of separate rows through the focus outline 24 in a flowing motion. Rows are followed one after the other in succession starting from the same end of each successive row. As with the line layout, the focus outline 24 moves slightly to meet the next thumbnail in the train. When the user input indicates horizontal scroll, the thumbnails 23 in the column that includes the focus thumbnail 25 are moved through the focus outline 24 one at a time. Because the horizontal dimension of the grid is set to a number thumbnails that can be displayed all at one time, that is, to five thumbnails in the present embodiment, browsing is simpler for the user, because he needs to think basically in a single dimension, rather than in two dimensions as would be the case if the grid were made larger in the horizontal direction. As a result, the user browses mainly in the vertical direction during the grid layout.

Figure 17:
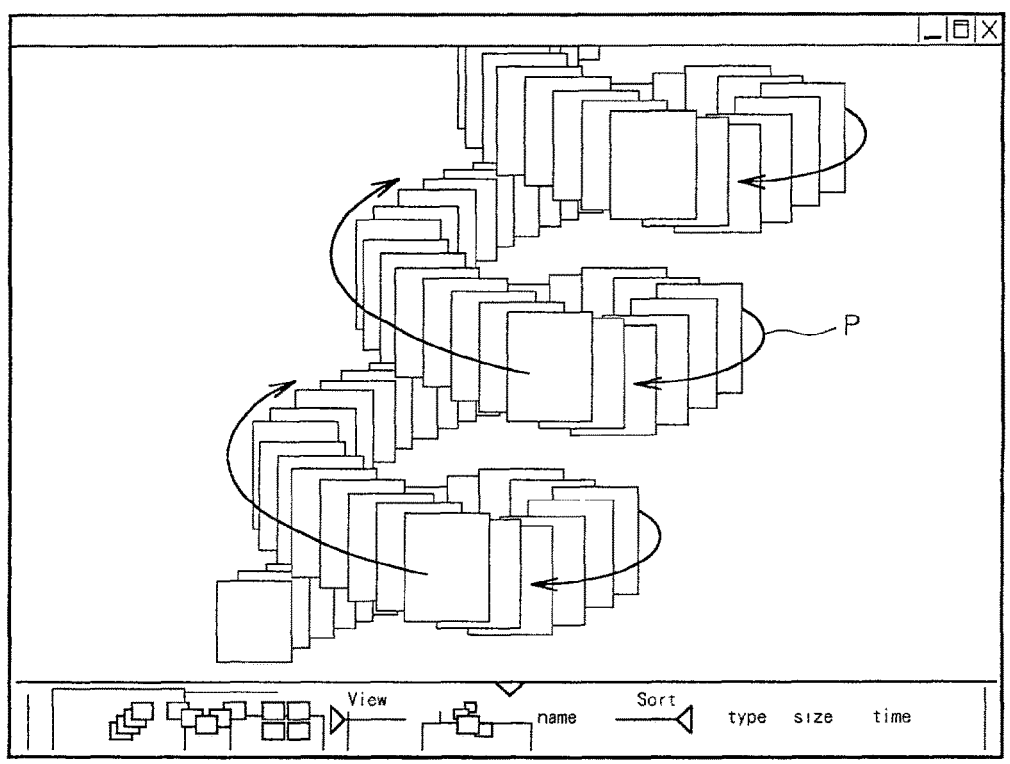
FIG. 17 is a schematic view showing browsing motion of a thumbnail helix in the helix layout.

In the case of the helix layout, when the user input indicates horizontal scroll, the helix spirals vertically in order to move the thumbnails 23 through the focus outline 24. The amount that the helix screwingly rotates depends on the number of thumbnails 23 scrolled. When more than a few thumbnails are scrolled in succession, then as shown in FIG. 17 the rotating helix is displayed in a contracted shape by reducing the radius of the helix and the inter-thumbnail distance, while the thumbnails 23 flow through the focus outline 24. When the continuous browsing input continues for longer than a certain duration of time, then the speed at which the thumbnails 23 move is accelerated. At this time, the display of the thumbnails 23 is adjusted to match the browsing speed. For example, the helix of the helix layout is displayed to contract with increase in browsing speed and expand with decrease in browsing speed. This visual change increases the user's awareness that the browsing speed has changed. The display or the circle layout is similarly contracted and expanded based on the duration and speed of browsing.

Returning to FIG. 4, when the user input indicates vertical scroll through the helix, the entire helix is shifted vertically by one pitch D, that is, by one inter-ring distance, without rotating. As a result, the present focus thumbnail 25 is shifted out of the focus outline 24, and the largest-scale thumbnail of the upper or lower adjacent ring, depending on the direction of scroll, is shifted into the focus outline 24. In the example shown in FIG. 4, when the user input is for moving the vertically by a single thumbnail, the helix is shifted downward by one pitch D so that the thumbnail 25' of the ring 35b shifts out of the focus outline 24 and the thumbnail 25" of ring 35a shifts into the focus outline 24. Because jumping to an adjacent ring in this way skips over the interposing ten thumbnails, the user can browse through more thumbnails much more rapidly than in the other layouts. Furthermore, with each jump, the ten thumbnails of another ring are brought into the range of the screen 21.

When the user wishes to change the layout or order of the thumbnails (S6: YES), then the routine proceeds to S20 of the flowchart of FIG. 8. In S20, the layout or order selected by the user is determined. In S21, the program manager 14 determines the rules for the newly selected layout or order, and pulls out the appropriate template from the layout/order template stock 15. In S22, the program manager 14 applies the template to the data objects in the file manager 11. In S23, the layout/order manager 12 creates a new display view, and controls the display 3 accordingly.

When the processes in S21 to S22 are performed to implement a new layout, the icon that represents the selected layout is shifted rightward to near the center bottom of the screen to indicate its selected condition. The icon of the preceding selected layout shifts leftward to the side to join the icons of the other non-selected layouts. This enables a user to easily know when he properly selected a layout icon. At the same time, the thumbnails 23 are repositioned from the preceding layout into the newly selected one.

For example, while the thumbnails 23 are being displayed in the line layout as shown in FIG. 1, when the user input indicates selection of the circle layout, the line layout icon 27d and the circle layout icon 27a move leftward and rightward respectively to switch positions, and the thumbnails 23 move into the circle layout, resulting in the display shown in FIG. 2. The actual movement of the icons is displayed. Also, actual movement is shown of the thumbnails from positions of the line layout into positions of the newly selected circle layout. This enables the user to know that the newly selected layout was properly implemented.

When the processes in S21 to S22 are performed to implement a new order, then in a manner similar to implementation of a new layout, the word that represents the newly selected order is shifted leftward to near the center bottom of the screen to indicate its selected condition. The word of the preceding selected order shifts rightward to the side to join the words of the other non-selected orders. At the same time, the thumbnails 23 are repositioned from the sequence of the preceding order into the sequence of the newly selected order.

Figure 18:
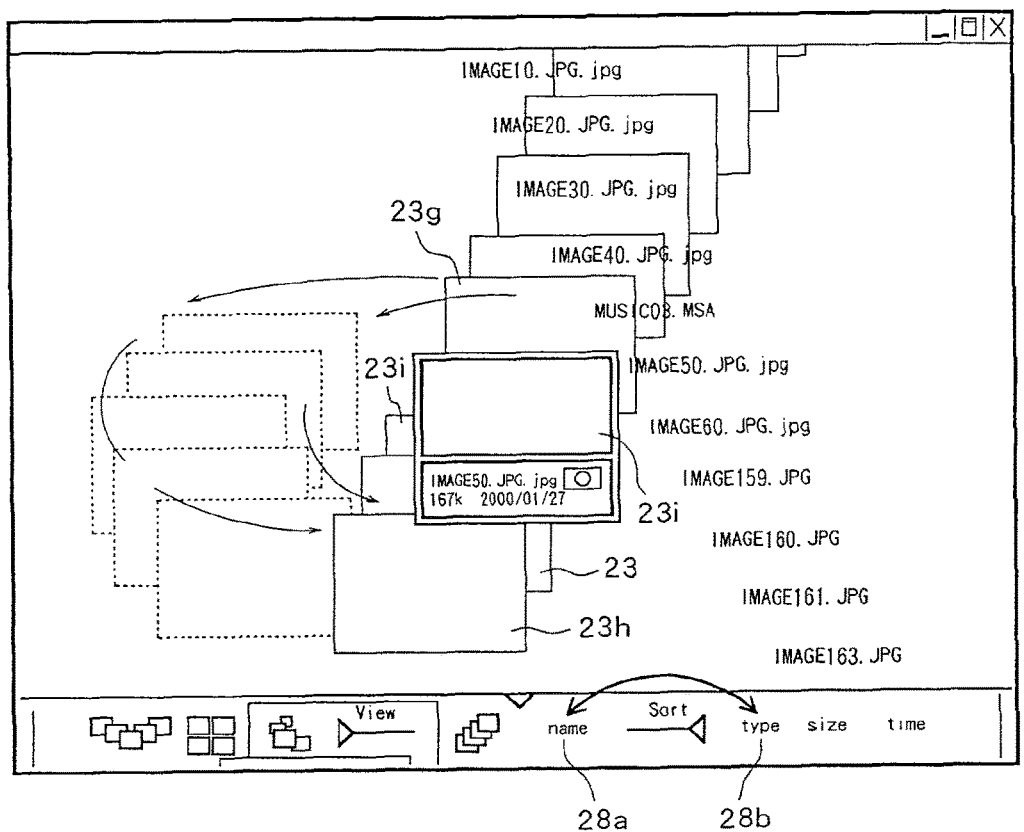
FIG. 18 is a schematic view showing motion of a thumbnail when a new order is selected.

In the example shown in FIG. 18, the user selects the type word 28b while the thumbnails 23 are being displayed in name order. In the shown example, all of the thumbnails 23 are the same type except for a thumbnail 23g, which represents a music file instead of an image file like the rest of the thumbnails 23. When type is selected for the order, then the thumbnail 23g falls out of line and shifts to the lead position of the line. The previous lead thumbnail 23h and other intervening thumbnails 23i all shift back one inter-thumbnail distance to restore order to the line. Actual movement of the thumbnails is shown from positions of the preceding order into positions of the newly selected order to enable the user to know for certain that the change in order was successful.

Figure 19:
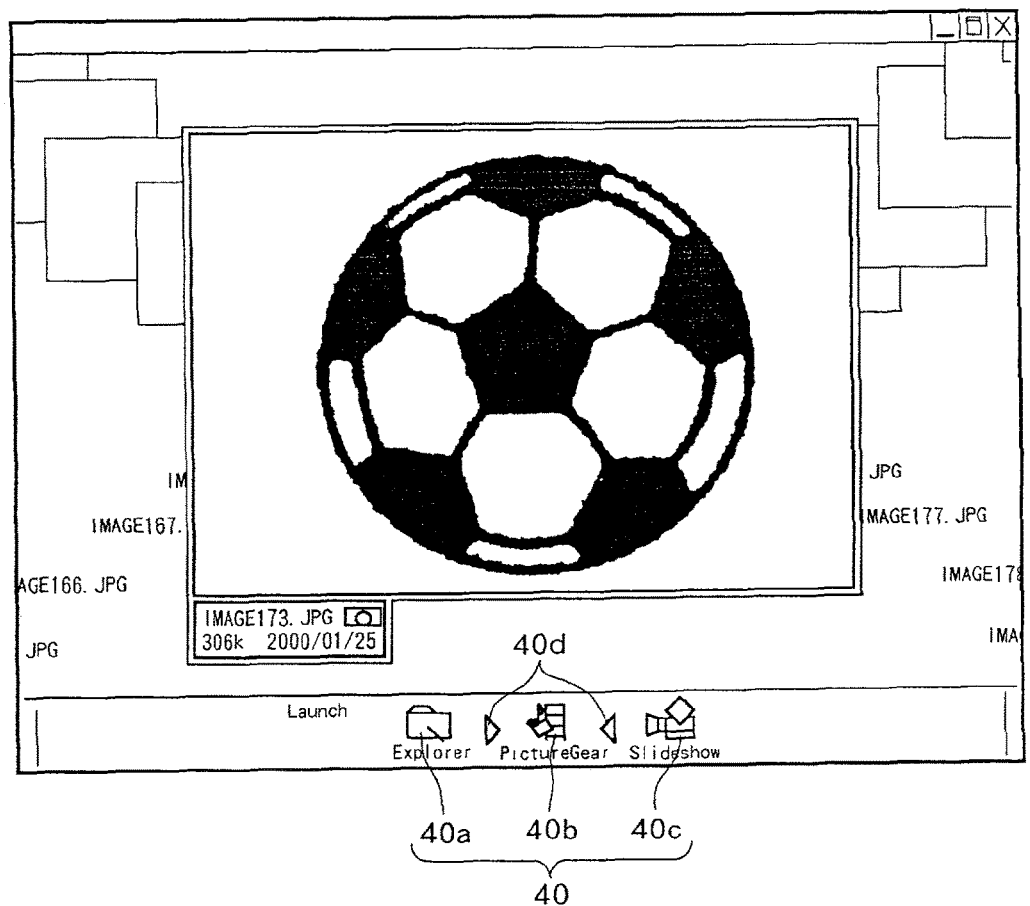
FIG. 19 is a schematic view showing the display window when a closer look is taken at the focus thumbnail.

A user can get a closer look at a desired thumbnail by increasing the scale of the thumbnail in the focus outline 24 to a larger scale. When the user wishes to look closer at the data object that is presently selected (S7: YES), then the routine proceeds to S30 of the flowchart of FIG. 9. In S30, input is received from the return key of the keyboard or equivalent input unit to indicate that the focus thumbnail 25 is selected. Then, as a result of S31 to 33, the screen appears as shown in FIG. 19. That is, in S31 the layout manager 12 increases the scale of the focus thumbnail 25 in the focus outline 24 to a larger scale. In S32, the program manager 14 disables the layout and order interfaces 27, 28 at the bottom of the screen 21, and in S33 enables a command interface 40 including icons 40a to 40c, which represent various application launchers. Arrows 40d are also displayed for indicating the icon of the application that will be launched when a command is received from the user. The user can change location of the arrows 40d by performing horizontal scroll operations. If the focus thumbnail 25 represents an audio file, then the program manager 14 plays the audio file when the focus thumbnail 25 is selected. If the focus thumbnail 25 represents a movie file, then the program manager 14 plays the movie when the focus thumbnail 25 is selected.

Next in S34, the user has the opportunity to use the command interface 40 to perform a variety of different processes on the selected data object. If the user does not wish to process the selected data object (S34: NO), then in S35 user input to this effect is received, such as from the user again pressing the return key while the arrows 40d surround all of the icons 40a to 40c, which indicates that no particular application has been selected. In S36, the layout/order manager 12 reduces the thumbnail 25 back to the original small scale. Then the flow returns to S6 or S30.

On the other hand, if the user wishes to process the selected data object (S34: YES), then the flow proceeds to S40 shown in the flowchart of FIG. 10. In S40, the user selects what process he wishes to perform on the selected data object. For example, the user can select to launch an application relating to the selected data object, to edit the data object using an edit interface, or to bookmark the data object using a bookmark interface. When the user chooses to launch an application, then in S41 the user selects the desired application. In S42, the program manager 14 accesses the operating system and launches the selected application. In S43, the file manager 11 transfers the selected data object to the launched application. In S44, the layout/order manager 12 reduces size of the focus thumbnail 25 to the original scale. In S45, the program manager 14 moves the launched application to the front. If the launched application is the one the user desired (S46: YES), the in S47 the user uses the new application and this flow is ended. If not (S46: NO), then the flow returns to point S6.

When the application is closed, before completely stopping display of the thumbnails, the thumbnails are shown scattering off the screen, to stress that the application has been terminated.

Here, the layout/order templates for determining mutual position and movement of thumbnails in each layout will be described in more detail. The layout manager 14 also includes information for defining the focus outline 24 at a position at or near the center of the screen 21. In templates for all layouts, the inter-thumbnail distance is set to a constant value of 64 pixels on the screen 21.

With respect to the line layout, the thumbnails are aligned on a line separated by 64 pixels. The line extends to a length L, which equals the number n of thumbnails times the constant 64 pixels (L=64n).

Figure 20:
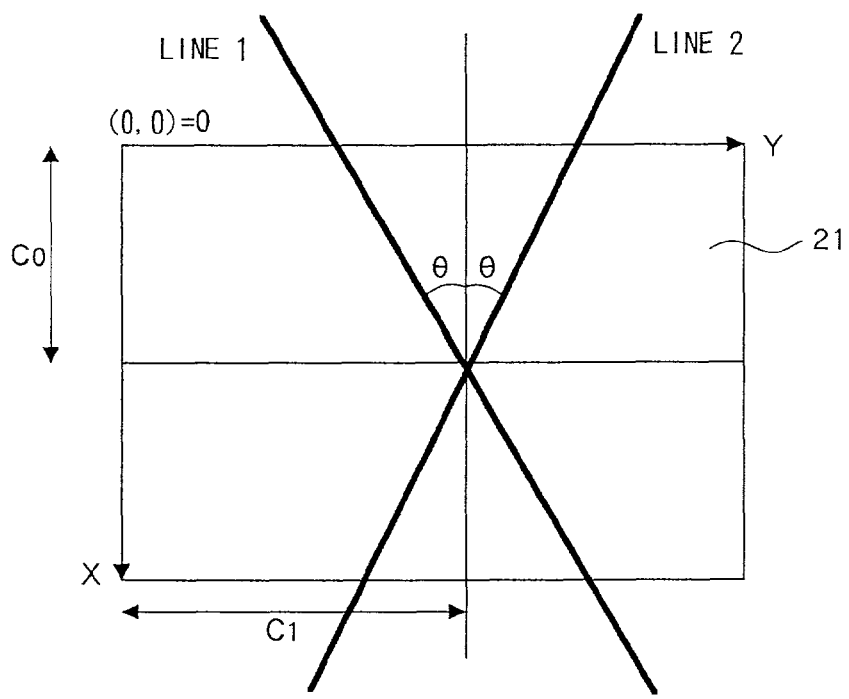
FIG. 20 is a graphical view for explaining the pivoting movement of the thumbnail line.

The content of the layout/order template for producing the reciprocal pivoting motion of the thumbnail line will be described with reference to FIG. 20. It should be noted than the pivoting movement of the line layout continues even during browsing. The center of thumbnails and the center of filenames are aligned on different ones of lines 1 and 2, separated from each other by the distance 64 pixels. The lines 1 and 2 are shown in FIG. 20 at the extremes of the reciprocal pivoting movement. Movement of the lines 1 and 2 are defined using the following formulas:

$$\text{Line 1 } y = \sin\left(\frac{\pi}{2}t\right)(y - c_0) + c_1$$

$$\text{Line 2 } y = -\sin\left(\frac{\pi}{2}t\right)(y - c_0) + c_1$$

wherein x and y are coordinates on the display screen 21;
t is time in seconds; and
$c_0$ and $c_1$ are the coordinates at the center of the screen 21.

In the example of FIG. 20, $c_0$ represents the distance from the top of screen 21 to the center of the screen, and $c_1$ represents the distance from the right side of the screen 21 to the center of the screen. Angle θ shown in FIG. 20 is determined using the following formula:

$$\theta = \frac{\pi}{2}t$$

Figure 21:
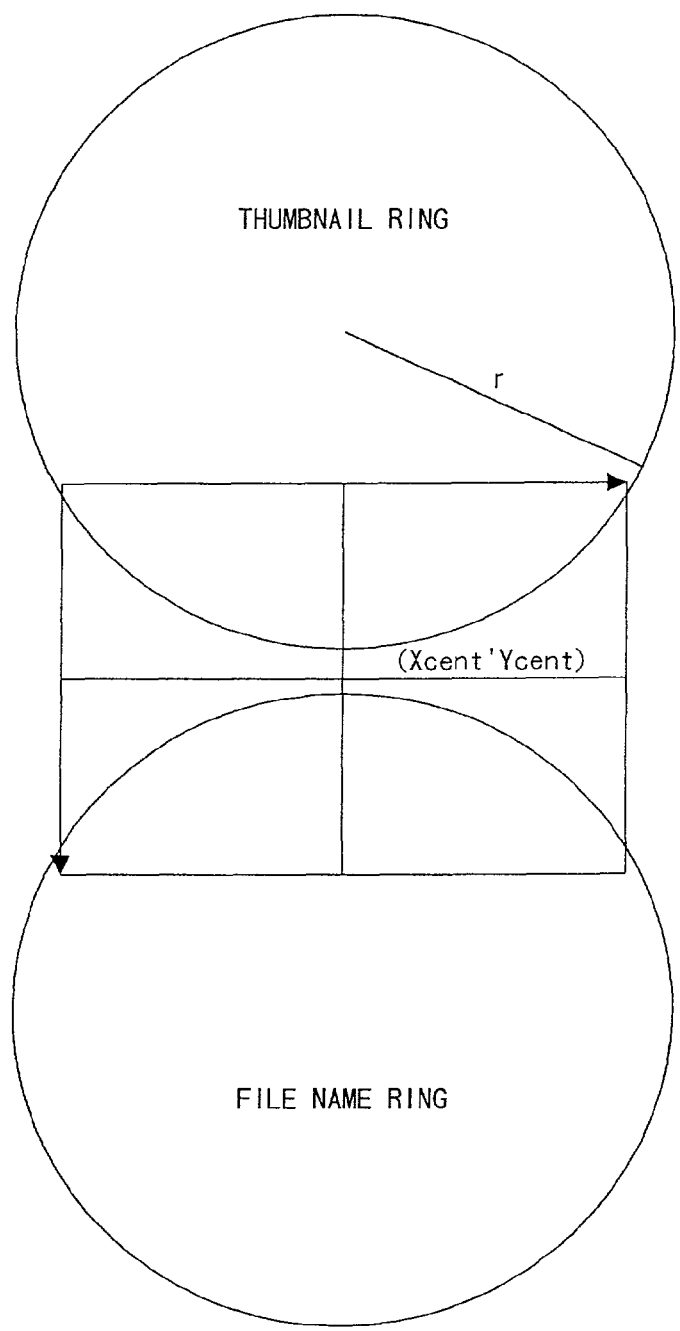
FIG. 21 is a graphical view for explaining the form of the circle layout.

The template for the circle layout will be explained with reference to FIG. 21. The radius r of the thumbnail and file name circles is determined based on the following formula:

$$r = \frac{64n}{2\pi}$$

The center of the thumbnail circle is determined based on the following formula:

$$(x_{circle1}, Y_{circle\ 1}) = (x_{cent}, Y_{cent} - r - 64)$$

The center of filename circle is determined based on the following formula:

$$(x_{circle2}, Y_{circle\ 2}) = (x_{cent}, Y_{cent} + r + 64)$$

The position of each thumbnail in the thumbnail circle is determined based on the following formula:

$$(x_{1i}, y_{1i}) = \left(x_{circle1} + r\sin\left(\frac{2\pi}{n}i\right),\ y_{circle1} + r\cos\left(\frac{2\pi}{n}i\right)\right)$$

The position of each file name in the file name circle is determined based on the following formula:

$$(x_{2i}, y_{2i}) = \left(x_{circle2} + r\sin\left(\frac{2\pi}{n}i\right),\ y_{circle2} - r\cos\left(\frac{2\pi}{n}i\right)\right)$$

Figure 22:
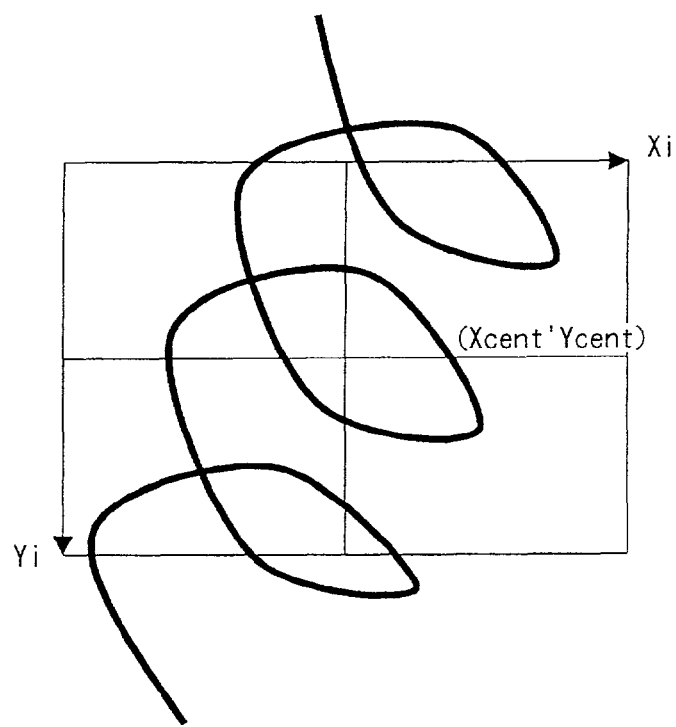
FIG. 22 is a graphical view for explaining the form of the helix layout.

Here, the template for displaying the helix layout will be explained with reference to FIG. 22. The x, y, and z coordinates of each thumbnail in the helix are determined based on the following formulas:

$$x_i = x_{cent} + r\sin\left(\frac{2\pi}{9}j\right) - \frac{r}{20}j$$

$$y_i = y_{cent} + \frac{r}{10}j$$

$$z_i = r - r\cos\left(\frac{2\pi}{9}j\right)$$

wherein i is a thumbnail number representing a target thumbnail of all the thumbnails. For example, to determine the position of a second thumbnail in the thumbnail train, the value of i is set to two. The value of j is determined by subtracting n from i (j=i−n), wherein n is the thumbnail number of the focus thumbnail. For example, if the target thumbnail is the focus thumbnail, then j would equal zero. The scale of each thumbnail 23 is determined based on its Z-axis coordinate.

Next, content of the templates for determining slide movement during browsing will be explained while referring to FIGS. 23 (a) to 25. The example will be given for the situation shown in FIG. 23 (b), wherein four thumbnails 231 to 234 are arranged in the line layout. The thumbnail 233 is the present focus thumbnail 25 as indicated in box a.

Figure 23:
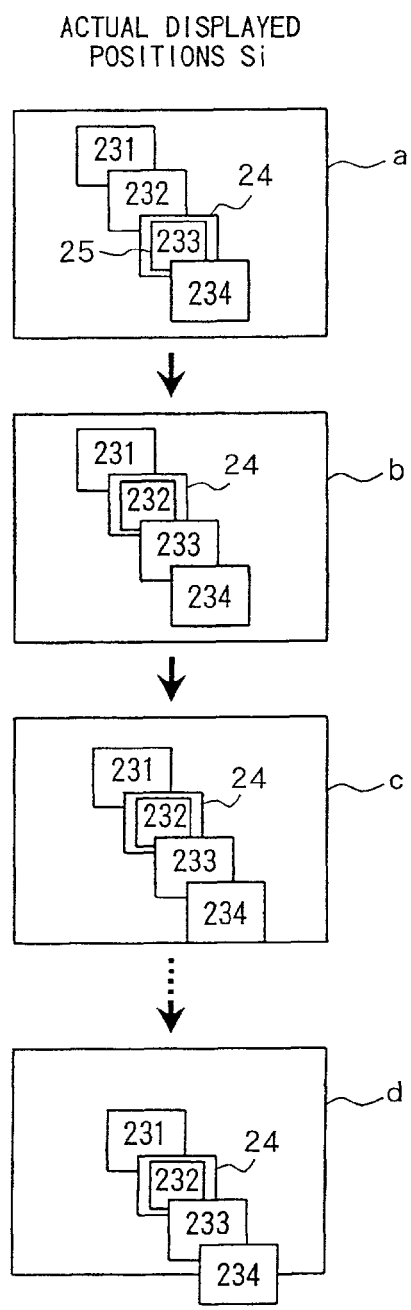
FIG. 23 (a) is a schematic view showing displayed position of thumbnails before, during, and after the focus thumbnail is changed.
Figure 23:
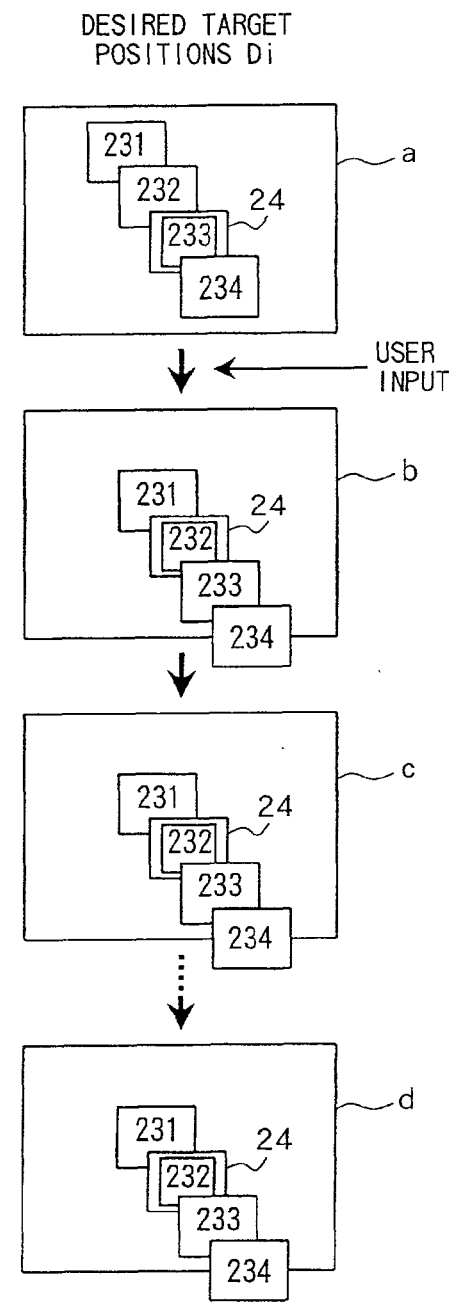

When the user input indicates to change the focus thumbnail to the next higher in the thumbnail line, that is, to the thumbnail 232, then the layout/order manager 12 sets target positions $D_i$ for the thumbnails 231 to 234 based on the thumbnail 232 being centered in the screen as the focus thumbnail 25 as shown in box b of FIG. 23 (b). By comparing boxes b in FIGS. 23 (a) and 23 (b), it can be seen that the newly set target positions $D_i$ of the thumbnails 231 to 234 are different from the present positions $S_i$. Therefore, the layout/order manager 12 gradually changes display of the thumbnails 23 as can be seen by comparing boxes c in FIGS. 23 (a) and 23 (b), until the target positions $D_i$ match the actual positions $S_i$ of the thumbnails 231 to 234 as shown in boxes d of FIGS. 23 (a) and 23 (b).

Figure 24:
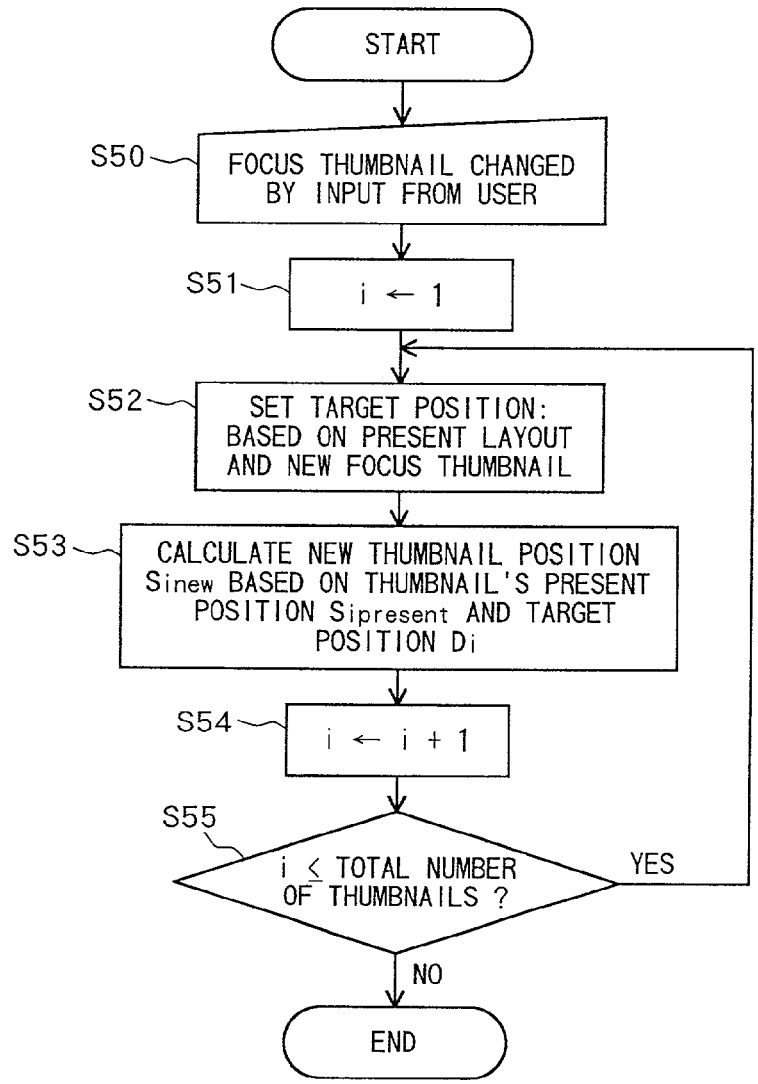
FIG. 24 is a flowchart showing operations for implementing movement of the thumbnails shown in FIG. 23 (b)

Next, a routine performed by the program manager 14 for changing the display of thumbnails in this manner will be described while referring to the flowchart in FIG. 24. This routine is performed each time the screen is updated. The screen is updated at a fixed interval of 30 times per second. First in S50, the focus thumbnail 25 is changed by input from the user. It should be noted that if no input is received from the user to change the focus thumbnail 25, then this routine is ended here. Then in S51, a thumbnail number i in a counter is set to one. The thumbnail number i indicates a present thumbnail under consideration.

In S52, the target position $D_i$ of the ith thumbnail is set based on the new focus thumbnail selected in S50. It should be noted that the target position $D_i$ is also set based on the present layout. For example, if the present layout is the helix layout, then the target position $D_i$ will be a position somewhere on the helix shape defined by the helix layout template. This is true for all the layouts.

In S53, a new position $S_{inew}$ for the ith thumbnail is calculated based on the ith thumbnail's present position $S_{ipresent}$ and the target position $D_i$. The new position $S_{inew}$ is determined based on the following formula:

$$S_{inew}=S_{ipresent}+((D_i-S_{ipresent})/5)$$

Figure 25:
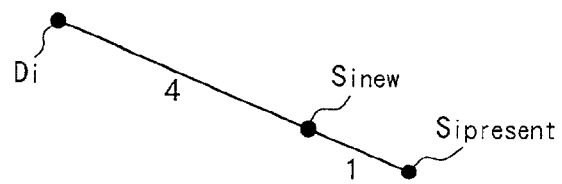
FIG. 25 is a view schematically showing determination of a new position for the newly selected thumbnail.

That is, as shown in FIG. 25, the distance between the ith thumbnail's present position $S_{ipresent}$ and the target position $D_i$ is divided into five segments. The new position $S_{inew}$ is set to a position one fifth the distance from the present position $S_{ipresent}$.

Then, in S54 the thumbnail number i is incremented by one to change focus of the routine to the next thumbnail in the thumbnail train. Once the routine has been performed for all the thumbnails in the thumbnail train (S55: YES), then this routine is ended.

As a result of repeated runs of this routine, the thumbnails will eventually reach their target positions. Because of the process in S53, the thumbnails will move quickly at first, and then reduce speed as they approach their new target positions in a type of movement commonly referred to as "easing in." This gives the effect that the thumbnails settle into their new target positions.

As mentioned above, the focus outline 24 moves slightly to greet the next thumbnail in the thumbnail train during browsing operations. The templates include information for displaying this motion.

Figure 26:
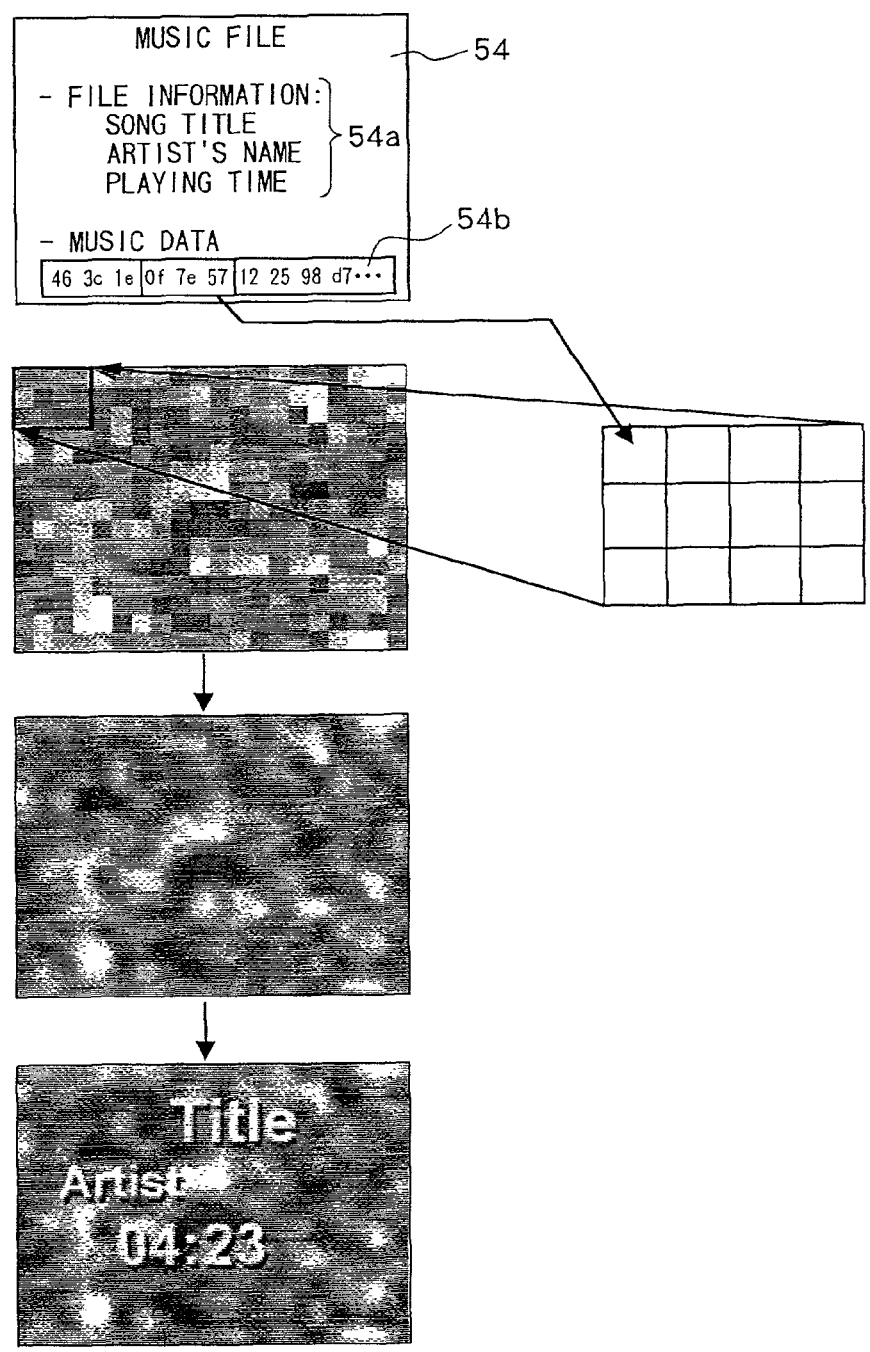
FIG. 26 is a schematic view representing processes for displaying audio files visually as thumbnails.
Figure 27:
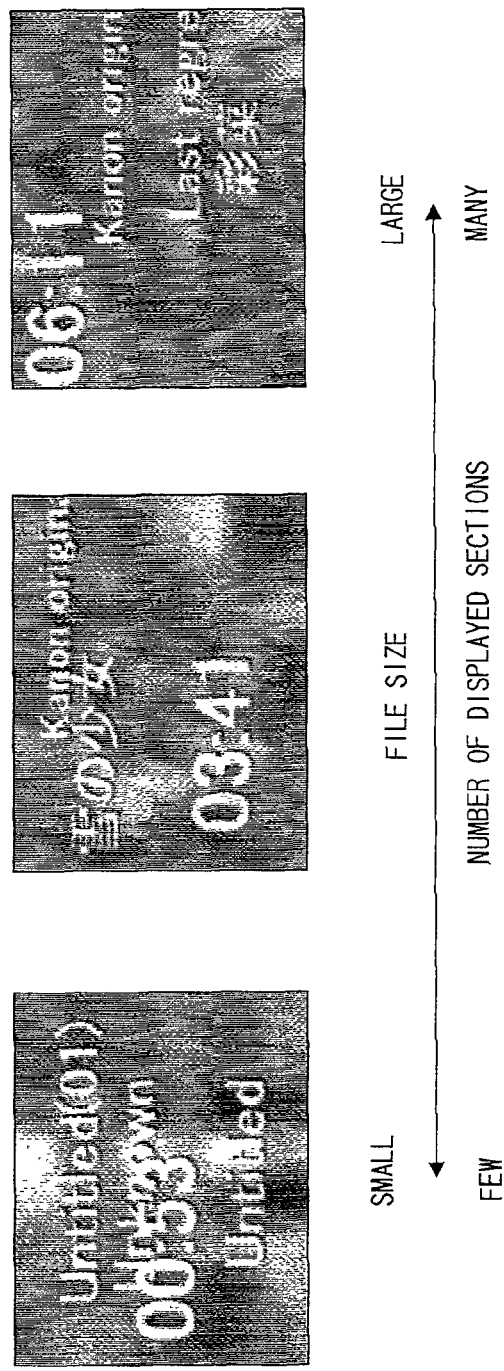
FIG. 27 is a schematic view showing thumbnails divided into sections depending on the amount of data in corresponding audio files.

FIGS. 26 and 27 show an example of how thumbnails that represent audio files are visually displayed based on size and content of the audio files. As shown in FIG. 26, a music file 54 includes file information 54a and music data 54b. The file information 54a includes title of the song, the artist's name, and the playing time. To produce a thumbnail for the music file 54, first a portion of the music data is retrieved. The amount of data retrieved at this time depends on the size of the music file, that is, if the music file is large, then a great deal of data is retrieved. The retrieved data is divided into sections. In the present example, it will be assumed that the retrieved data is divided into 300 sections. Each section has three 16-bit sets. In the example of FIG. 26 one representative section has the three 16-bit sets of 0f 7e 57 in hexadecimal notation. The 16-bit sets in each section are used to define one of 256 possible color gradations for each of red, green, and blue colors. In the example of FIG. 26, the 16-bit sets of 0f, 7e, and 57 are used to determined gradations of red, green, and blue respectively.

The thumbnail for the audio file is divided into the same number of sections as the retrieved music data, that is, into 300 sections in this example, by dividing a thumbnail into 300 sections (15×20). The color gradations determined by the three 16-bit sets of each section are used to display color in the corresponding section of the thumbnail as shown in the second square from the top in FIG. 26. Once RGB values for all sections of the display have been determined, then borders between display sections are blurred as shown in the third square from the top in FIG. 26. Then various file information is superimposed in capital letters over the blurred image as shown in the bottom square in FIG. 26.

As shown in FIG. 27, the number of display sections is increased or decreased depending on the size of the corresponding data file. That is, thumbnails for large data files are displayed with many sections, and thumbnails for small data files are displayed with few sections.

While the invention has been described in detail with reference to specific embodiments thereof, it would be apparent to those skilled in the art that various changes and modifications may be made therein without departing from the spirit of the invention, the scope of which is defined by the attached claims.

For example, the embodiment described data objects being loaded from a memory card into a computer. However, the memory card can be replaced by any local storage device, such as flash memory, recordable media, hard disk, or CD-ROM. Alternatively, data objects can be provided over a networked server, or from any combination of local memories and networks.

Further, data objects could be transferred via a network protocol by using a standalone application or browser applet. Such a configuration could be used as an on-line multimedia photo album, wherein a user uploads data-objects to a server, and others browse the data-objects from remote terminals. Alternately, the user's computer itself could be used as a server.

Figure 28:
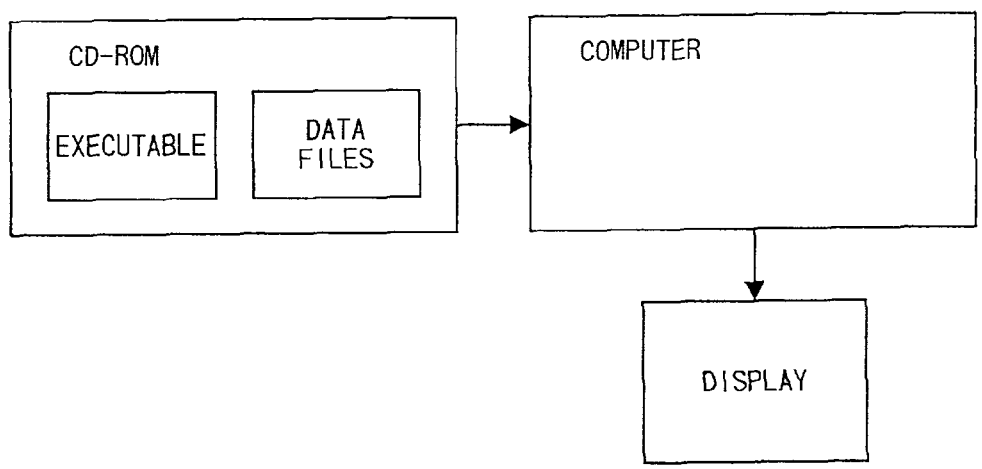
FIG. 28 is a schematic view showing configuration of a CD-ROM.

When the data objects are provided from a CD-ROM, then in this case also the data objects can be loaded from the CD-ROM into the file manager automatically upon insertion of the CD-ROM into the computer. However, as shown in FIG. 28, all executable applications, such as for performing the loading operation, for displaying the thumbnail according to the selected layout, and changing display of the thumbnail and graphical icons when a different layout is selected, must be provided on the CD-ROM.

Figure 29:
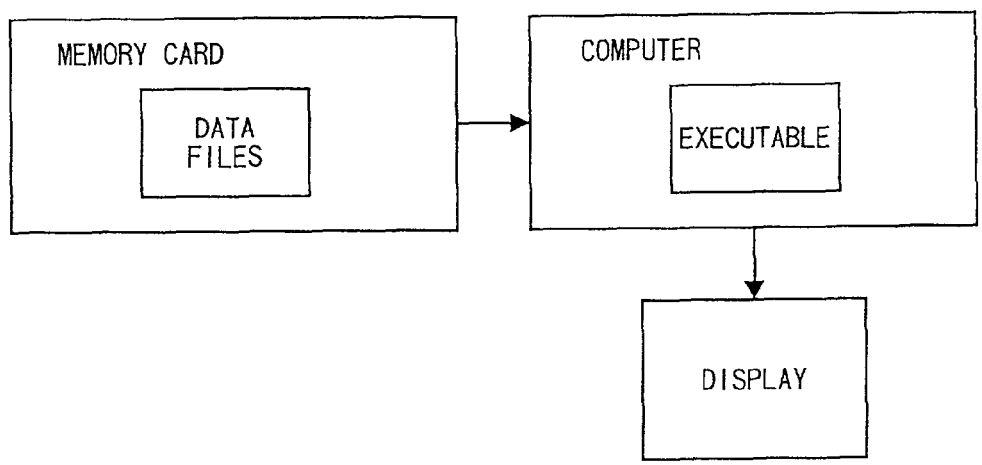
FIG. 29 is a schematic view showing configuration of a memory card.

This contrast to the case of a memory card. As shown in FIG. 29, executables are provided in the computer's hard disk or over a network. Use of a memory card is preferable because the executables can be used with many different data files, not just those on the memory card. Also, the executables can be upgraded independently of the data files. Further, although an application run from either a CD-ROM or a memory card becomes the front-most application, other applications are inaccessible in the case of CD-ROM, but are accessible in the case of memory card.

Although the embodiment describes launching an application in S41 for a single data object, an application could be launched for more than one data object. For example, the user can bookmark several thumbnails using the bookmark interface, and then launch the application for all of the book marked thumbnails.

The layout interface 27 uses icons to represent layouts, and the order interface 28 uses words to represent orders. However, any indicia can be used to represent layouts and orders.

Although the embodiment described layouts and orders as being predetermined, the computer could be modified to enable a user to define new layouts and orders. New layouts can be defined using a visual programming function that a user uses to position and size a series of thumbnails or other data object representatives in a repeatable pattern. Such new layouts can be shared and distributed through a plug-in architecture. New orders can be defined by the user simply adding a new file attribute to the list of order parameters. Search criteria could also be stored and used as order parameters.

Figure 30:
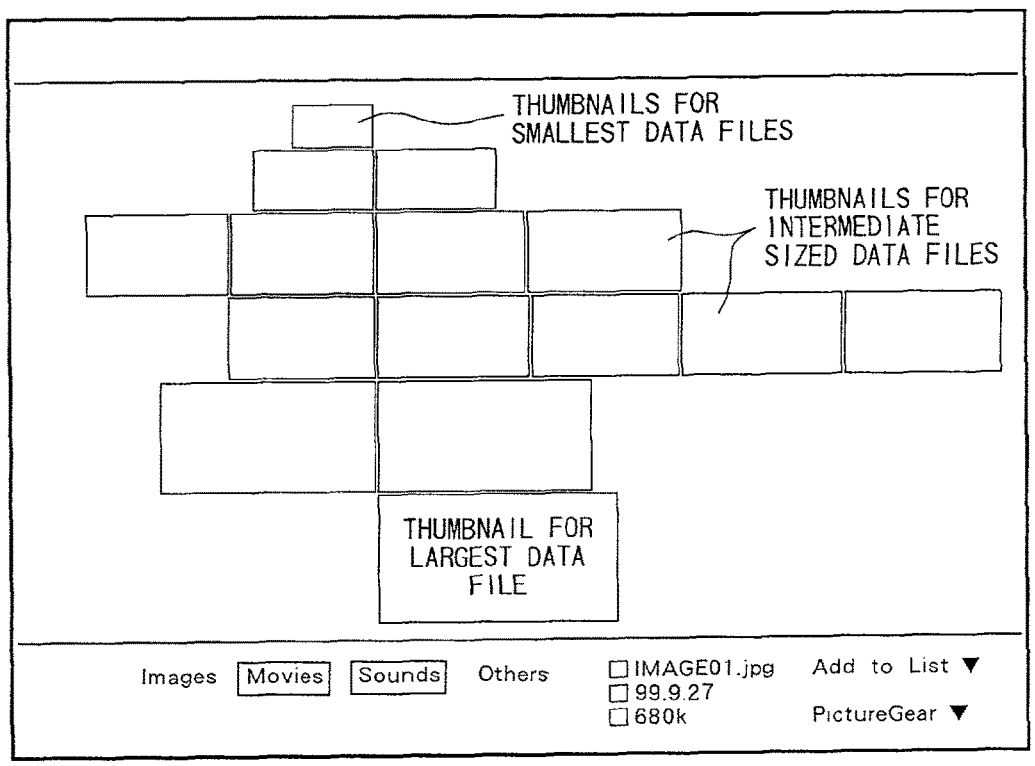
FIG. 30 is a schematic view showing thumbnails displayed according to the size of the corresponding data files.

In the embodiment, thumbnails and the overall layout are displayed in the same manner regardless of the selected order. However, the thumbnails and layout could be displayed in a manner dependent on the selected order. For example, when file size is chosen as the order, then as shown in FIG. 30 each thumbnail can be displayed in a size relative to the overall range of sizes for the data objects. In two-dimensional layouts, such as the grid, line, and circle layout, the thumbnail need only be scaled in X and Y directions. However, since scaling is used as a part of three dimensional layouts, that is, the helix layout, a thumbnail's relative size can be represented by adding isometric dimensionality or "thickness" to the thumbnail.

When time is chosen as the order, the sequence or pattern of how thumbnails are displayed can be varied based on how close together the data objects are in time. For example, the time between two data objects can be represented by varying the space between two thumbnail. In the example shown in FIG. 31, data objects represented by thumbnails 23m and 23n are separated by a relatively short time, so the thumbnails 23m and 23n are displayed separated by a relatively short distance SD. Data objects represented by thumbnails 23o and 23p are separated by a relatively long time, so the thumbnails 23o and 23p are displayed separated by a relatively long distance LD.

Figure 31:
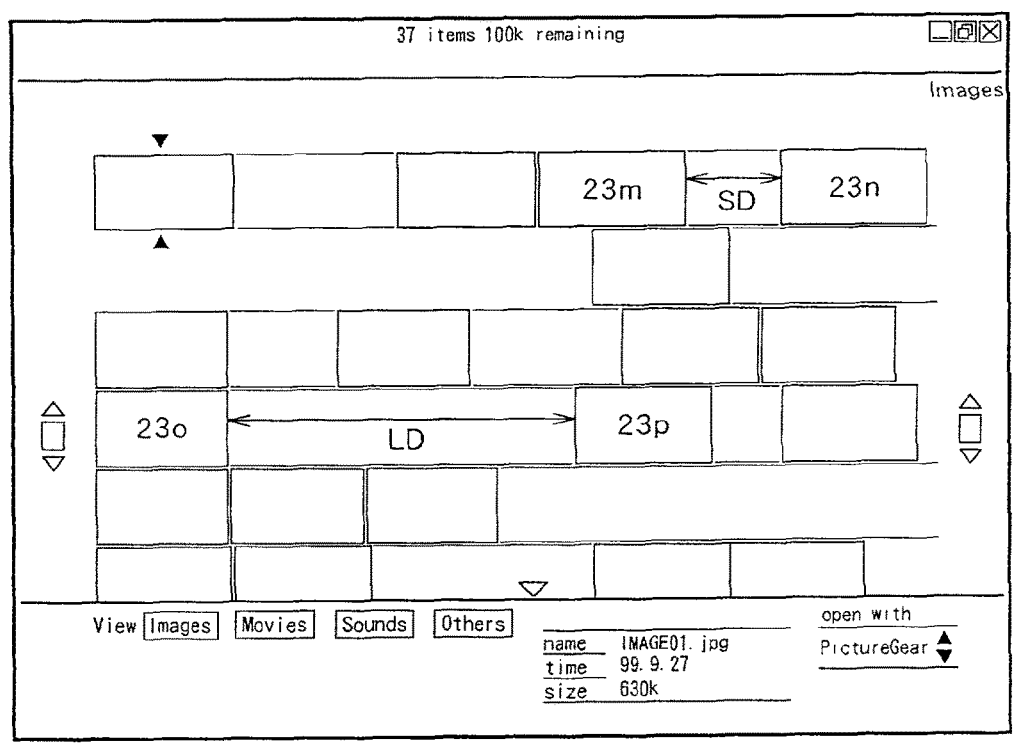
FIG. 31 is a schematic view showing thumbnails displayed separated from each other depending on timing of the corresponding data files.
Figure 32:
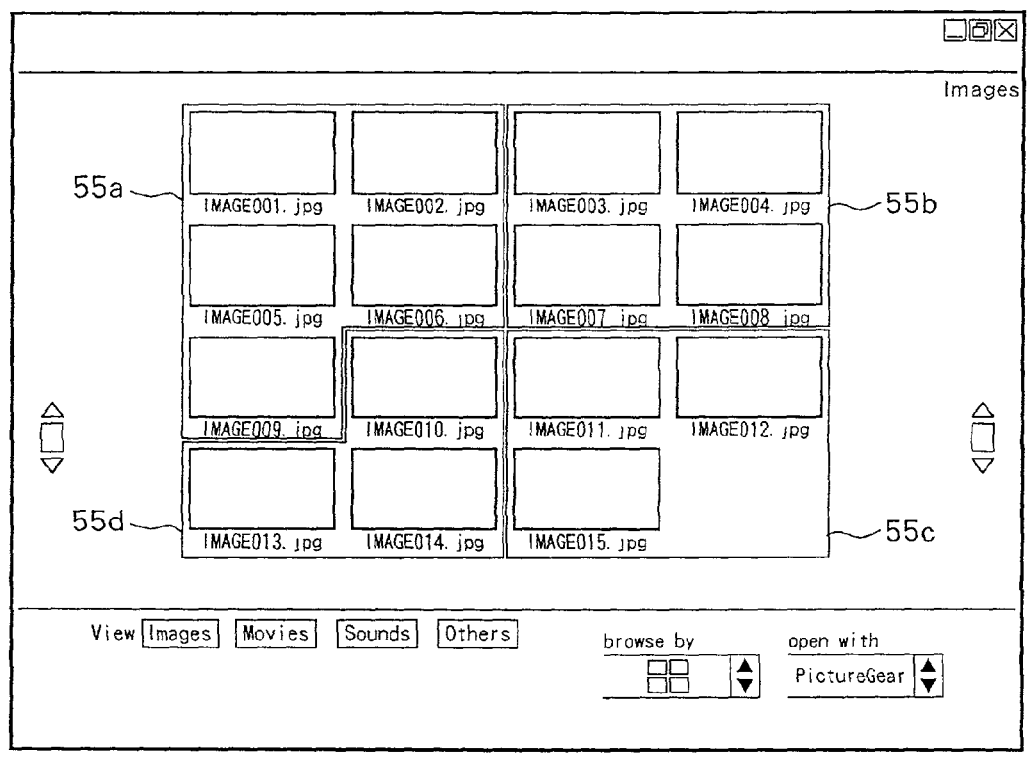
FIG. 32 is a schematic view showing thumbnails displayed in groups depending on the relationship of the corresponding data files.

Alternately, thumbnails can be grouped together, and the groups separated from each other, as shown in FIG. 31 depending on how close in time the thumbnails are. For example, if a collection of images were taken, or a set of files were created, all within a certain time span, then the images or files from that time span can be grouped together, and separated from other groups when there is a significant time gap between the images or files of other groups. In the example shown in FIG. 32, digital photos that are taken less than 15 minutes apart are placed in the same group, and different groups are displayed encompassed by lines 55a to 55d. That is, photos taken more than 15 minutes apart are put into a separate groups. Such groups could alternately be indicated using different colors or text labels.

A more sophisticated algorithm can take into account overall image taking frequency, total elapsed time, and image criteria to adjust the groupings dynamically. Examples of how image taking frequency, total elapsed time, and image criteria can be used to adjust grouping will be given for the situation of taking images with a digital camera.

Image taking frequency can be measured by determining the time intervals between all images taken, finding the average interval, and comparing each time interval with the average interval. Whether images have a time interval greater or less than average can be used as a weighting factor for determining whether or not thumbnails should be displayed in different groups.

Total elapsed time refers to the entire duration of time from when the first image was taken to when the last image was taken. The standard time difference used to determine what thumbnails are grouped together can be varied depending on the elapsed time. For example, if only an hour has elapsed since the first image was taken, then the standard time difference might be set to ten minutes. However, if 10 hours has elapsed, then the standard time difference might be set to one hour.

Image criteria refers to using certain criteria, such as brightness level, color, and pattern recognition of images, to determine whether images should be grouped together or not. Each image is analyzed for certain criteria, and thumbnails for images sharing the same characteristics are grouped together.

Any dynamic element, such as icons, can be used instead of thumbnails to represent the data objects. However, thumbnails are preferable to icons, because the thumbnail is the essence of the data object itself. For example, when the thumbnail is a depiction of an image, the thumbnail is the essence of the image itself in a smaller size. An icon is a generic representation of a file type, in which case all of the same type of image would have the same icon.

The outline 24 need not be provided for indicating the focus thumbnail 25, which is the focus of operations induced by input from the user. The focus thumbnail 25 can be designated merely by placement in a focus region, without displaying the focus outline 24 itself.

In the embodiment, the application is launched when the memory card 2 is inserted into the slot 2a. However, the application can be launched when the memory card 2 is selected based on input from the user input unit 4.

In the embodiment, the same application is launched when any memory card is selected or inserted. However, different applications can be launched depending on the data in the memory card or the type of memory card, or to launch an application only for certain memory cards.

Although the embodiment described the system as being user controlled, the system could also be autonomous. For example, a slide show mode can be provided for randomly presenting thumbnails, automatically without user control. This is similar to a slide show program that randomly displays images in a certain folder. The slide show mode can be initiated automatically in the manner of a screen saver mode after a period of in-action by the user. The user can easily interrupt the screen saver mode by taking any action. It would also be possible for the user to directly initiate this slide show function.

What is claimed is:

1. A device for managing visual items that represent content files, each content file having a respective file name associated therewith, the device comprising:
  a program processor;
  a display;
  a selection module which, when executed by the program processor, receives selection of a particular visual item from among a plurality of visual items displayed within a non-linear arrangement on the display, each of the plurality of visual items displayed at a respective position within the non-linear arrangement;
    wherein the selecting of the particular visual item from among the plurality of visual items indicates that the particular visual item is selected to be re-positioned from an out-of-focus position within the non-linear arrangement to an in-focus position within the non-linear arrangement; and
    wherein the out-of-focus position and the in-focus position are not adjacent to each other; and
  a movement module which, when executed by the program processor, responds to the selection of the particular visual item by automatically causing the plurality of visual items to shift positions within the non-linear arrangement, without changing positions relative to each other, until the particular visual item is in the in-focus position.

2. The device of claim 1, further comprising a control module which, when executed by the program processor, allows, in response to detecting that the particular visual item is in the in-focus position, performing one or more operations on the content file corresponding to the particular visual item.

3. The device of claim 2, wherein the control module further causes playing, in response to detecting that the particular visual item is in the in-focus position, content included in the content file corresponding to the particular visual item.

4. The device of claim 3, wherein the control module further causes displaying, during playing of the content corresponding to the particular visual item, the particular visual item as larger than other visual items from among the plurality of visual items in the non-linear arrangement.

5. The device of claim 1, wherein the content file corresponding to the particular visual item from among the plurality of visual items comprises an audio file.

6. The device of claim 1, wherein the content file corresponding to the particular visual item from among the plurality of visual items comprises an image file.

7. The device of claim 1, wherein the content file corresponding to the particular visual item from among the plurality of visual items depicts an album jacket image for a musical album.

8. The device of claim 1, wherein at least one of the plurality of visual items partially overlaps its adjacent visual items in the non-linear arrangement.

9. The device of claim 1, wherein a file name associated with the particular visual item is displayed adjacent to the in-focus position.

10. A method for managing visual items that represent content files, each content file having a respective file name associated therewith, the method comprising:
    selecting a particular visual item from among a plurality of visual items displayed within a non-linear arrangement, each of the plurality of visual items displayed at a respective position within the non-linear arrangement;
        wherein the selecting of the particular visual item from among the plurality of visual items indicates that the particular visual item is selected to be re-positioned from an out-of-focus position within the non-linear arrangement to an in-focus position within the non-linear arrangement; and
        wherein the out-of-focus position and the in-focus position are not adjacent to each other; and
    in response to selecting the particular visual item, automatically causing the plurality of visual items to shift positions within the non-linear arrangement without changing positions relative to each other until the particular visual item is in the in-focus position.

11. The method of claim 10, further comprising: in response to detecting that the particular visual item is in the in-focus position, performing one or more operations on the content file corresponding to the particular visual item.

12. The method of claim 11, further comprising: in response to detecting that the particular visual item is in the in-focus position, playing content included in the content file corresponding to the particular visual item.

13. The method of claim 12, wherein, during playing of the content corresponding to the particular visual item, the particular visual item is displayed as larger than other visual items from among the plurality of visual items in the non-linear arrangement.

14. The method of claim 10, wherein the content file corresponding to the particular visual item from among the plurality of visual items comprises an audio file.

15. The method of claim 10, wherein the content file corresponding to the particular visual item from among the plurality of visual items comprises an image file.

16. A non-transitory computer-readable storage medium storing one or more instructions for managing visual items that represent content files, each content file having a respective file name associated therewith, the one or more instructions which, when executed by one or more processors, cause the one or more processors to perform:
    selecting a particular visual item from among a plurality of visual items displayed within a non-linear arrangement, each of the plurality of visual items displayed at a respective position within the non-linear arrangement;
        wherein the selecting of the particular visual item from among the plurality of visual items indicates that the particular visual item is selected to be re-positioned from an out-of-focus position within the non-linear arrangement to an in-focus position within the non-linear arrangement; and
        wherein the out-of-focus position and the in-focus position are not adjacent to each other; and
    in response to selecting the particular visual item, automatically causing the plurality of visual items to shift positions within the non-linear arrangement without changing positions relative to each other until the particular visual item is in the in-focus position.

17. The non-transitory computer-readable storage medium of claim 16, storing additional instructions which, when executed, cause: in response to detecting that the particular visual item is in the in-focus position, performing one or more operations on the content file corresponding to the particular visual item.

18. The non-transitory computer-readable storage medium of claim 17, storing additional instructions which, when executed, cause: in response to detecting that the particular visual item is in the in-focus position, playing content included in the content file corresponding to the particular visual item.

19. The non-transitory computer-readable storage medium of claim 18, storing additional instructions which, when executed, cause: displaying, during playing of the content corresponding to the particular visual item, the particular visual item as larger than other visual items from among the plurality of visual items in the non-linear arrangement.

20. The non-transitory computer-readable storage medium of claim 16, wherein the content file corresponding to the particular visual item from among the plurality of visual items comprises an audio file.

* * * * *